US012712841B2

(12) United States Patent
Barfield, Jr. et al.

(10) Patent No.: US 12,712,841 B2
(45) **Date of Patent: *Aug. 18, 2026**

(54) SYSTEM AND METHOD FOR USER COMMUNICATION IN A NETWORK

(71) Applicant: Match Group, LLC, Dallas, TX (US)

(72) Inventors: Robert Gex Barfield, Jr., Plano, TX (US); William Elmore, Carrollton, TX (US); Mark Allan Cooke, Frisco, TX (US)

(73) Assignee: Match Group, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,910

(22) Filed: May 13, 2024

(65) Prior Publication Data

US 2024/0422120 A1 Dec. 19, 2024

Related U.S. Application Data

(63) Continuation of application No. 17/398,322, filed on Aug. 10, 2021, now Pat. No. 12,010,085, which is a continuation of application No. 16/729,366, filed on Dec. 28, 2019, now Pat. No. 11,088,986, which is a (Continued)

(51) Int. Cl.

| | |
|---|---|
| ***H04L 51/52*** | (2022.01) |
| ***G06F 3/00*** | (2006.01) |
| ***G06F 15/16*** | (2006.01) |
| ***G06F 17/30*** | (2006.01) |
| ***G06F 21/62*** | (2013.01) |
| ***H04L 12/18*** | (2006.01) |
| ***H04L 15/16*** | (2006.01) |
| ***H04L 51/212*** | (2022.01) |
| ***H04L 51/214*** | (2022.01) |
| ***H04L 51/216*** | (2022.01) |
| ***H04L 51/56*** | (2022.01) |
| *H04M 3/53* | (2006.01) |

(52) U.S. Cl.

CPC ............ *H04L 51/52* (2022.05); *H04L 51/214* (2022.05); *H04L 51/212* (2022.05); *H04L 51/216* (2022.05); *H04M 3/53* (2013.01); *H04M 2203/4509* (2013.01)

(58) Field of Classification Search

CPC ............. H04L 65/4053; H04L 65/1089; H04L 65/1069; G06F 40/30

USPC ........................................................ 709/204

See application file for complete search history.

(56) References Cited

U.S. PATENT DOCUMENTS

| | | | |
|---|---|---|---|
| 5,950,200 | A | 9/1999 | Sudai et al. |
| 7,124,164 | B1 | 10/2006 | Chemtob |
| 7,285,090 | B2 | 10/2007 | Stivoric et al. |

(Continued)

*Primary Examiner* — Berhanu Shitayewoldetsadik

(74) *Attorney, Agent, or Firm* — Patent Capital Group

(57) ABSTRACT

Methods and systems for user communication in an online community and/or website are provided. User profile data may be accessed to from a memory. An analysis system compares the user profile data for the user with a time-dependent goal to determine a result. The time-dependent goal may be determined based on an analysis of a set of (successful) users. A user interface system generates a representation of the result for prompting the user to initiate a communication to a different user based on the time-dependent goal. The representation may comprise a metered representation indicating an amount of progress, by the user, toward the time-dependent goal.

15 Claims, 22 Drawing Sheets

Related U.S. Application Data continuation of application No. 14/283,601, filed on May 21, 2014, now Pat. No. 10,523,622.

(56) References Cited

U.S. PATENT DOCUMENTS

| | | | | |
|---|---|---|---|---|
| 7,487,018 | B2 | 2/2009 | Afshar et al. | |
| 7,493,372 | B2 | 2/2009 | Crabtree et al. | |
| 7,788,042 | B2 | 8/2010 | Barnett et al. | |
| 8,095,408 | B2 | 1/2012 | Schigel et al. | |
| 8,332,418 | B1 | 12/2012 | Giordani et al. | |
| 8,566,327 | B2 | 10/2013 | Carrico et al. | |
| 8,677,174 | B2 | 3/2014 | Bobak et al. | |
| 8,924,035 | B2 | 12/2014 | Greene et al. | |
| 9,560,156 | B1 | 1/2017 | Rana et al. | |
| 10,523,622 | B2 | 12/2019 | Barfield, Jr. et al. | |
| 11,088,986 | B2 | 8/2021 | Barfield, Jr. et al. | |
| 12,010,085 | B2 | 6/2024 | Barfield, Jr. et al. | |
| 2003/0028498 | A1 | 2/2003 | Hayes-Roth | |
| 2004/0002050 | A1 | 1/2004 | Wagner et al. | |
| 2004/0210661 | A1 | 10/2004 | Thompson | |
| 2005/0055639 | A1 | 3/2005 | Fogg | |
| 2006/0059159 | A1* | 3/2006 | Truong | G06Q 10/10 |
| 2006/0282426 | A1 | 12/2006 | Spears | |
| 2008/0120390 | A1* | 5/2008 | Robinson | H04W 4/021 709/204 |
| 2008/0155426 | A1 | 6/2008 | Robertson et al. | |
| 2008/0195946 | A1 | 8/2008 | Peri-Glass | |
| 2008/0288590 | A1 | 11/2008 | Lynch | |
| 2009/0070133 | A1 | 3/2009 | Bonilla et al. | |
| 2009/0164464 | A1* | 6/2009 | Carrico | G06Q 50/10 707/999.005 |
| 2009/0199113 | A1 | 8/2009 | McWhinnie et al. | |
| 2009/0322597 | A1 | 12/2009 | Herrero et al. | |
| 2010/0077032 | A1 | 3/2010 | Drennan et al. | |
| 2010/0246576 | A1 | 9/2010 | Bustamente | |
| 2010/0283827 | A1 | 11/2010 | Bustamente | |
| 2010/0287286 | A1 | 11/2010 | Bustamente | |
| 2011/0087436 | A1 | 4/2011 | Klapa et al. | |
| 2011/0276507 | A1 | 11/2011 | O'Malley | |
| 2011/0313647 | A1 | 12/2011 | Koebler et al. | |
| 2012/0084353 | A1 | 4/2012 | Herde et al. | |
| 2012/0173212 | A1 | 7/2012 | Rameau et al. | |
| 2012/0226991 | A1 | 9/2012 | Drennan et al. | |
| 2012/0310427 | A1 | 12/2012 | Williams et al. | |
| 2013/0152211 | A1 | 6/2013 | Wu et al. | |
| 2013/0166488 | A1* | 6/2013 | Yang | G06N 5/02 706/46 |
| 2013/0212479 | A1 | 8/2013 | Willis et al. | |
| 2013/0290209 | A1 | 10/2013 | Wirz | |
| 2014/0074874 | A1* | 3/2014 | Fraccaroli | G06F 16/284 707/758 |
| 2014/0157171 | A1 | 6/2014 | Brust et al. | |
| 2014/0172480 | A1 | 6/2014 | Strickholm | |
| 2014/0214801 | A1 | 7/2014 | Ciliberti | |
| 2014/0229486 | A1 | 8/2014 | Kveton et al. | |
| 2014/0244381 | A1* | 8/2014 | Polyakov | G06Q 30/0269 705/14.66 |
| 2014/0322677 | A1* | 10/2014 | Segal | G09B 5/02 434/107 |
| 2015/0150100 | A1* | 5/2015 | Soni | H04L 63/0876 726/7 |

* cited by examiner

FIG. 2D

Figure 2E:
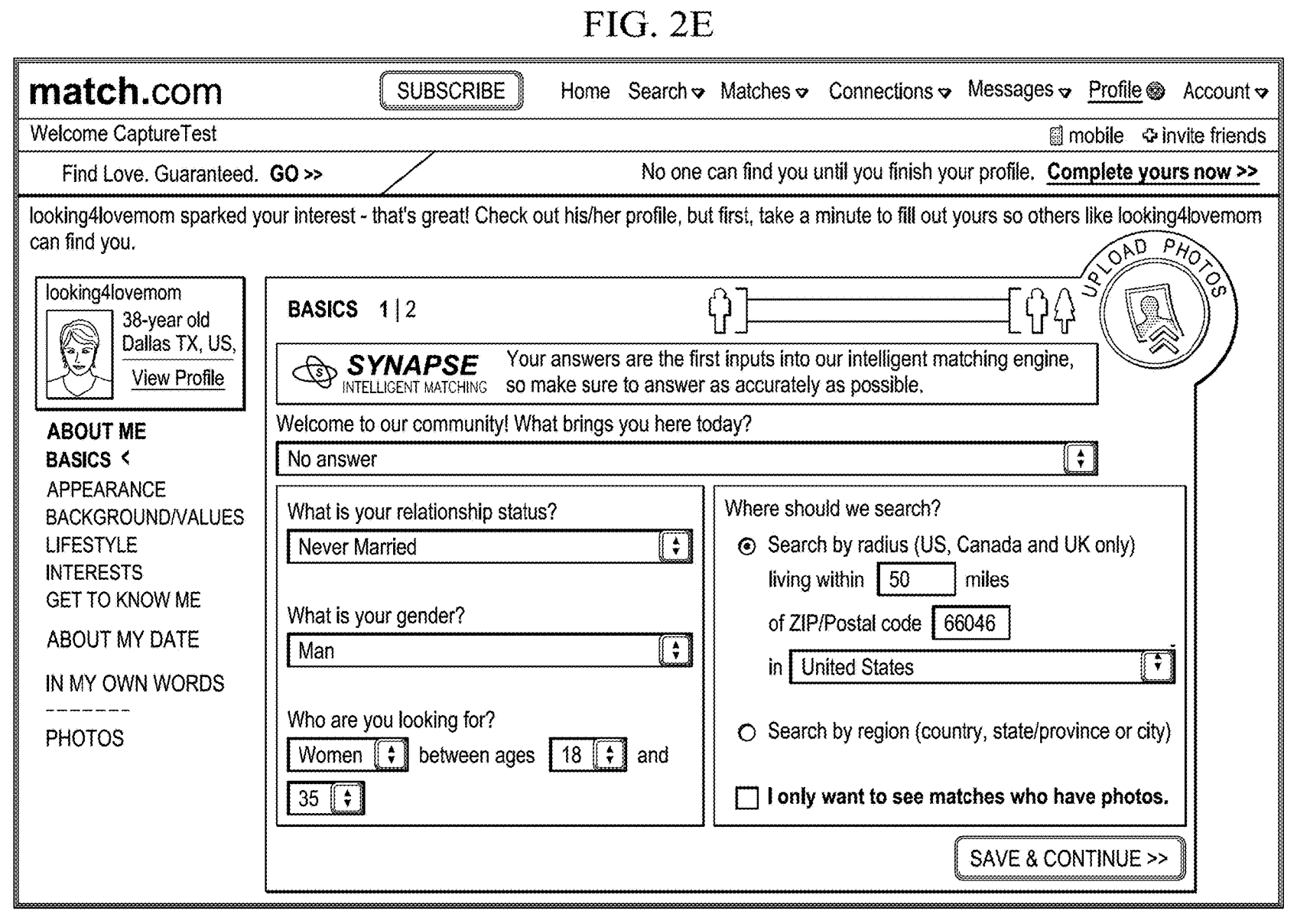

FIG. 2E match.com
SUBSCRIBE
Home Search Matches Connections Messages Profile Account
Welcome CaptureTest
mobile invite friends
Find Love. Guaranteed. GO >>
No one can find you until you finish your profile. Complete yours now >>
looking4lovemom sparked your interest - that's great! Check out his/her profile, but first, take a minute to fill out yours so others like looking4lovemom can find you.
looking4lovemom
38-year old
Dallas TX, US,
View Profile
ABOUT ME
BASICS
APPEARANCE
BACKGROUND/VALUES
LIFESTYLE
INTERESTS
GET TO KNOW ME
ABOUT MY DATE
IN MY OWN WORDS
PHOTOS
BASICS 1 | 2
UPLOAD PHOTOS
SYNAPSE
INTELLIGENT MATCHING
Your answers are the first inputs into our intelligent matching engine, so make sure to answer as accurately as possible.
Welcome to our community! What brings you here today?
No answer
What is your relationship status?
Never Married
What is your gender?
Man
Who are you looking for?
Women between ages 18 and 35
Where should we search?
Search by radius (US, Canada and UK only)
living within 50 miles
of ZIP/Postal code 66046
in United States
Search by region (country, state/province or city)
I only want to see matches who have photos.
SAVE & CONTINUE >>

FIG. 2F

Figure 2G:
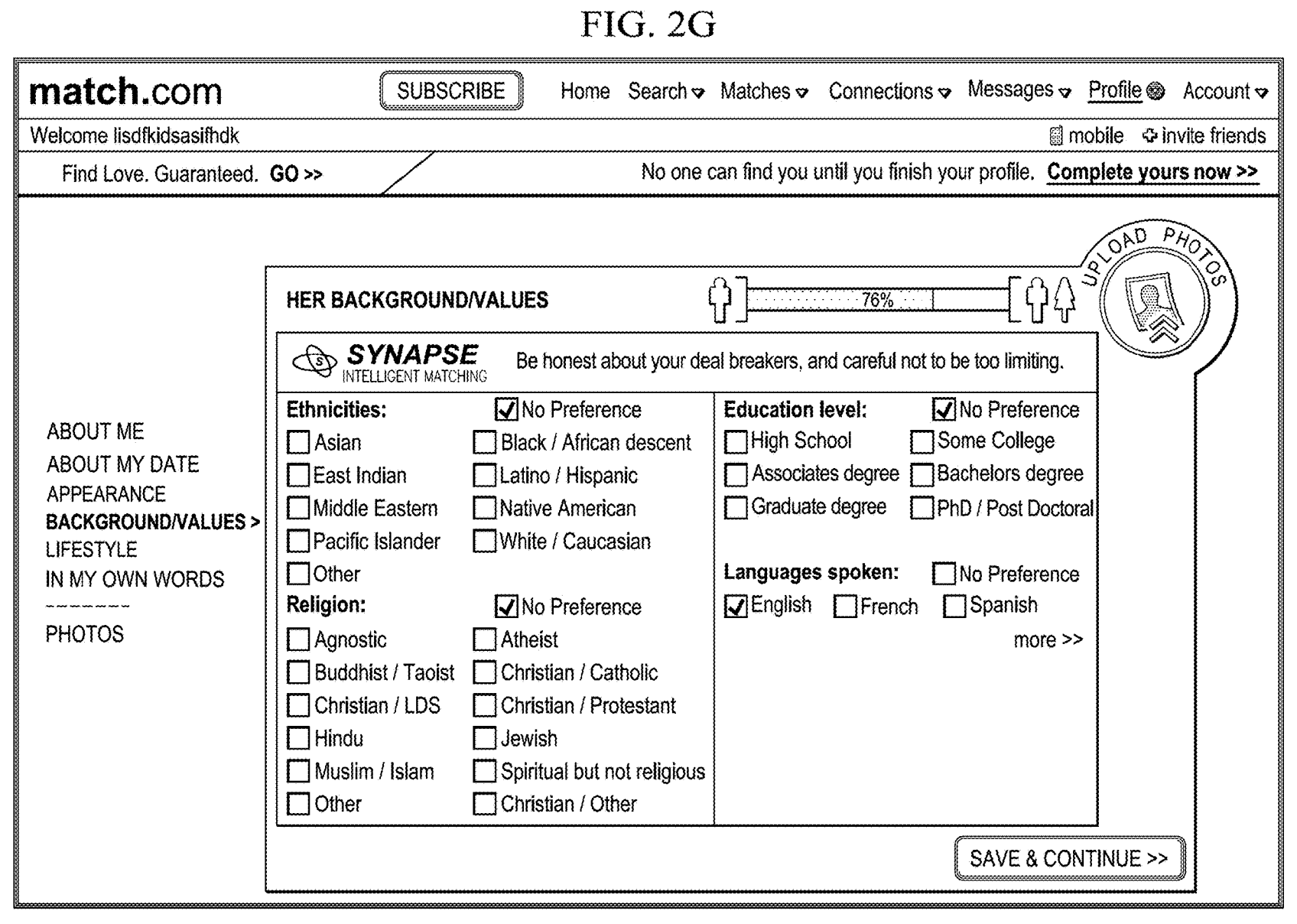

FIG. 2G match.com
SUBSCRIBE
Home Search ▿ Matches ▿ Connections ▿ Messages ▿ Profile Account ▿
Welcome lisdfkidsasifhdk
mobile invite friends
Find Love. Guaranteed. GO >>
No one can find you until you finish your profile. Complete yours now >>
ABOUT ME
ABOUT MY DATE
APPEARANCE
BACKGROUND/VALUES >
LIFESTYLE
IN MY OWN WORDS
PHOTOS
UPLOAD PHOTOS
76%
HER BACKGROUND/VALUES
SYNAPSE INTELLIGENT MATCHING
Be honest about your deal breakers, and careful not to be too limiting.
Ethnicities:
Asian
East Indian
Middle Eastern
Pacific Islander
Other
No Preference
Black / African descent
Latino / Hispanic
Native American
White / Caucasian
Religion:
Agnostic
Buddhist / Taoist
Christian / LDS
Hindu
Muslim / Islam
Other
No Preference
Atheist
Christian / Catholic
Christian / Protestant
Jewish
Spiritual but not religious
Christian / Other
Education level:
High School
Associates degree
Graduate degree
No Preference
Some College
Bachelors degree
PhD / Post Doctoral
Languages spoken:
English
French
No Preference
Spanish
more >>
SAVE & CONTINUE >>

FIG. 2H match.com  close window

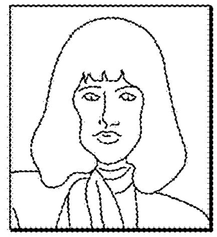

LadyDi520

Active within 24 hours New

Basics

"Looking for my Knight in Shining Armor"

| | |
|---|---|
| I am a: | 32 yr old woman |
| located in: | Dallas, Texas, United States |
| looking for: | Dating: 32 to 45-year old man within 25 miles of Dallas metroplex, Dallas, Texas, United States |
| relationships: | Currently separated |
| my ethnicity: | White / Caucasian |
| body type: | Slender |
| height: | 5' 4" (162.6 cms) |
| sense of humor: | Clever: Nothing's better than a quick-witted comeback, Friendly: I'll laugh at anything |
| sign: | Cancer |

About me and who I'd like to meet

I am a good person that is very caring, I have been married for almost 6 years and we are getting divorced. (I wanted it so don't say sorry LOL) I am just looking for someone that can make me smile, laugh, and enjoy life again it is too short to stay in something that has nothing left. I hope my knight in shining armor is out there somewhere!!!!!!

Appearance

| | |
|---|---|
| height: | 5' 4" (162.6 cms) |
| eyes: | Green |
| hair: | Auburn / Red |
| body type: | Slender |
| body art: | Belly button ring |
| best feature: | Chest |

Interests for fun:

I love to have a good time at whatever I am doing. I love to laugh I love to smile and I am looking for that someone that can make that happen, it hasn't for a LONG time.

Figure 2I:
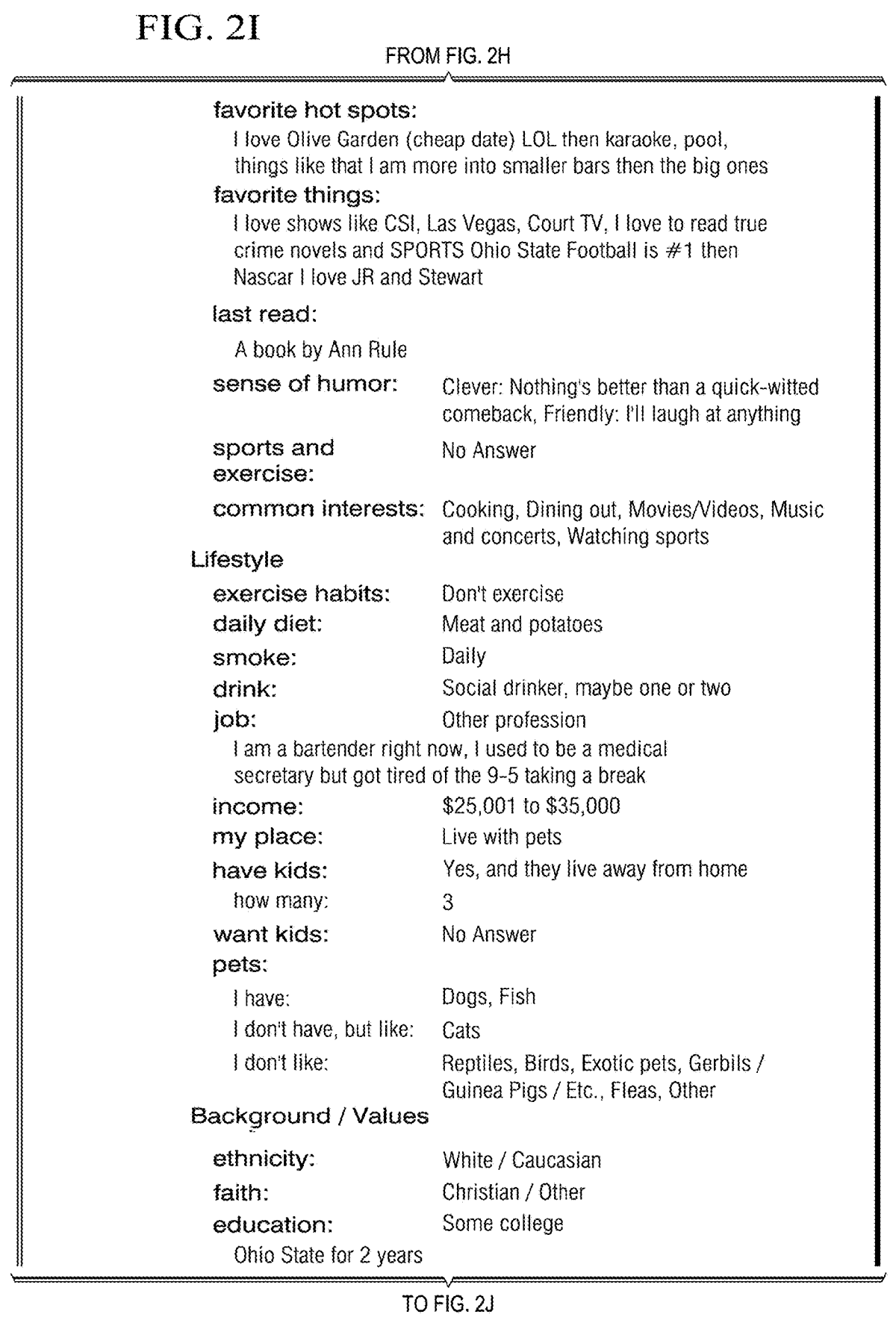

FROM FIG. 2H favorite hot spots:
I love Olive Garden (cheap date) LOL then karaoke, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule sense of humor: Clever: Nothing's better than a quick-witted comeback, Friendly: I'll laugh at anything sports and exercise: No Answer common interests: Cooking, Dining out, Movies/Videos, Music and concerts, Watching sports Lifestyle exercise habits: Don't exercise
daily diet: Meat and potatoes
smoke: Daily
drink: Social drinker, maybe one or two
job: Other profession
I am a bartender right now, I used to be a medical secretary but got tired of the 9-5 taking a break
income: $25,001 to $35,000
my place: Live with pets
have kids: Yes, and they live away from home
how many: 3
want kids: No Answer
pets:
I have: Dogs, Fish
I don't have, but like: Cats
I don't like: Reptiles, Birds, Exotic pets, Gerbils / Guinea Pigs / Etc., Fleas, Other Background / Values ethnicity: White / Caucasian
faith: Christian / Other
education: Some college
Ohio State for 2 years

FROM FIG. 2I

| | |
|---|---|
| languages: | English |
| politics: | Conservative |

About My Date

| | |
|---|---|
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |

Fun

Boot scootin' across gritty floorboards, the band playing what we'll soon remember as "our song"

Photos

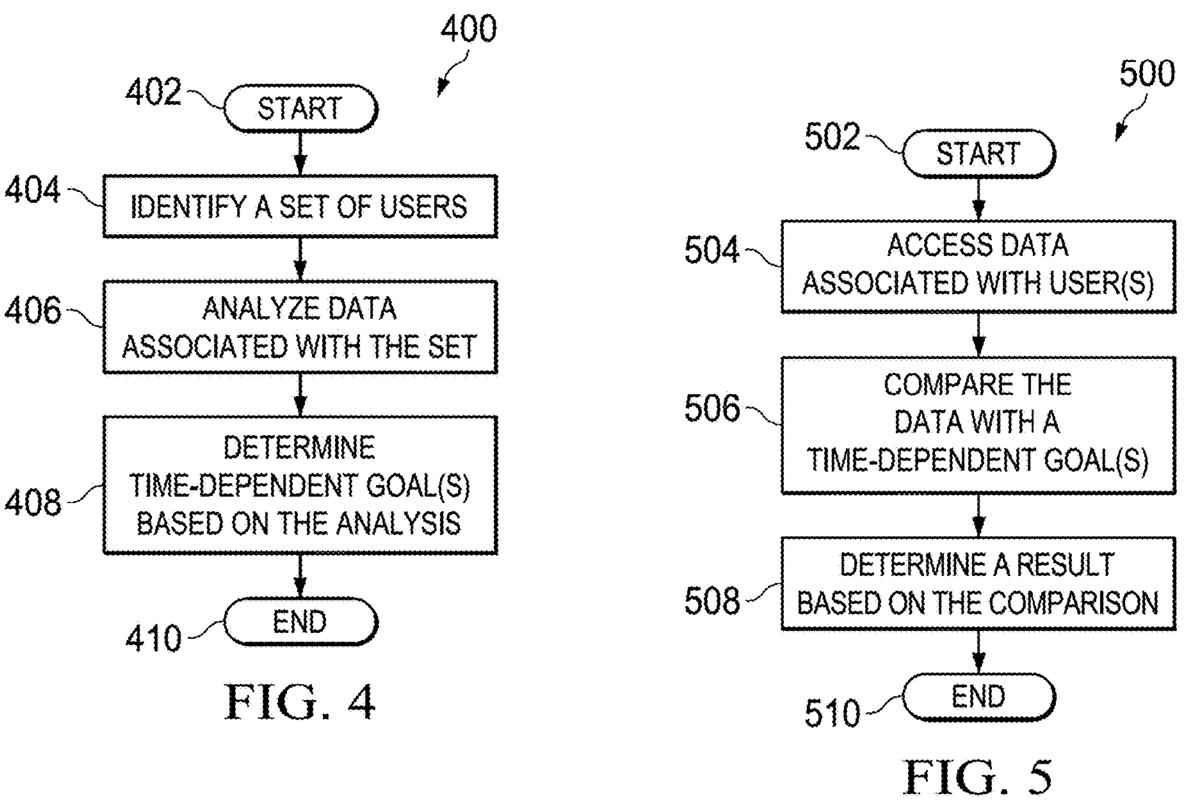
FIG. 4
FIG. 5
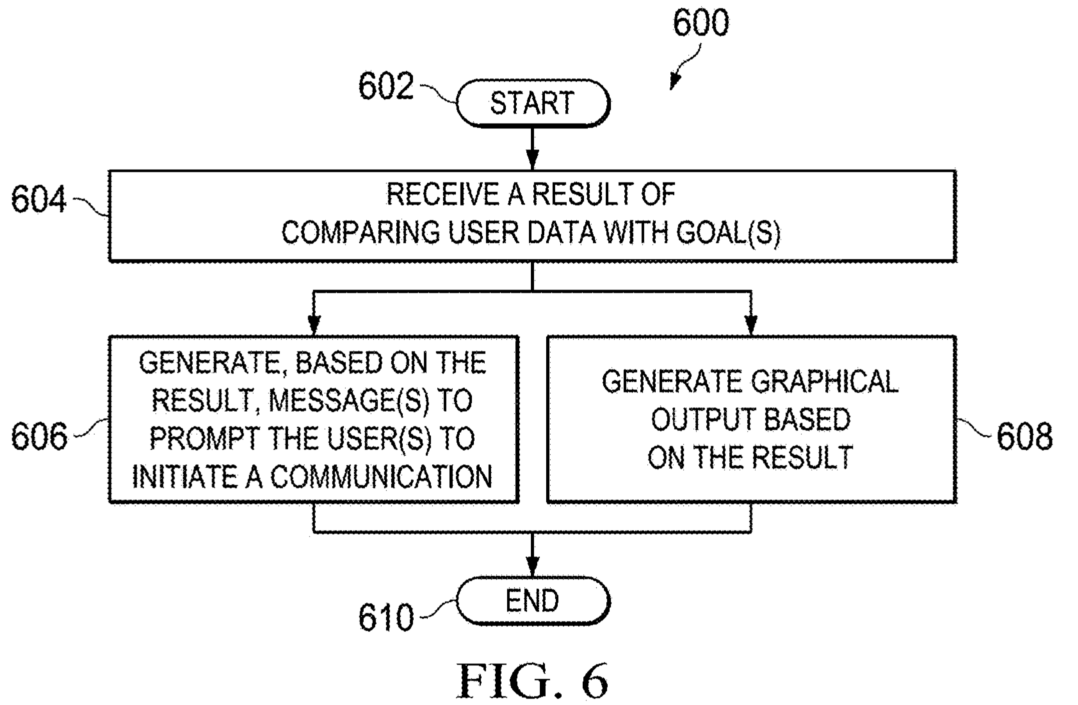
FIG. 6

FIG. 8B

FIG. 14
Home
Profile
Next
1406
crazyfresh67
1402
This world is beautiful in so many different ways.
Active within 3 days
35 years old
New York, NY
Seeking men
32-39 years old
within 50 miles of
New York, NY
See all (22) photos>
1404
Wink at Her
Email her
Add to Favorites
Call her
About Her
Relationships
Never Married
Have Kids
No
Want Kids
Someday

SYSTEM AND METHOD FOR USER COMMUNICATION IN A NETWORK

CROSS-REFERENCE TO RELATED APPLICATIONS

This application is a continuation (and claims the benefit of priority under 35 U.S.C. § 120) of U.S. application Ser. No. 17/398,322 filed Aug. 10, 2021, entitled SYSTEM AND METHOD FOR USER COMMUNICATION IN A NETWORK, which is a continuation of U.S. application Ser. No. 16/729,366 filed on Dec. 28, 2019, and entitled SYSTEM AND METHOD FOR USER COMMUNICATION IN A NETWORK, now U.S. Pat. No. 11,088,986 issued Aug. 10, 2021, which is a continuation of U.S. application Ser. No. 14/283,601, filed on May 21, 2014, and entitled SYSTEM AND METHOD FOR USER COMMUNICATION IN A NETWORK, now U.S. Pat. No. 10,523,622 issued Dec. 31, 2019. The disclosures of the prior applications are considered part of (and are incorporated in their entirety by reference in) the disclosure of this application.

TECHNICAL FIELD

This disclosure relates in general to the field of communications and, more particularly, to a system and a method for prompting users in a network environment to initiate social interactions.

BACKGROUND

Online communities allow users a convenient platform to locate one another, post content, and communicate with one another. In certain online communities, users are matched with one another based on the mutual interests of the users (e.g., matching a job candidate to an employment opportunity, matching members in an online dating). In the case of an online dating service, during a search for a potential dating match, a user may communicate with other users using various modes of communication.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2J are simplified screen shots of an example protocol for participating in an on-line dating service in accordance with one embodiment of the present disclosure;

FIG. 4 illustrates exemplary logic or a method for determining goals according to an embodiment of the present disclosure;

FIG. 5 illustrates exemplary logic or a method for comparing user data to a goal according to an embodiment of the present disclosure;

FIG. 6 illustrates exemplary logic or a method for generating a representation of a result of comparing user data to a goal according to an embodiment of the present disclosure;

FIGS. 8A-8D illustrate example screen shots that may be provided in an online dating process to facilitate presentation of information to and receiving input from users to facilitate communication on a website;

DETAILED DESCRIPTION OF EXAMPLE EMBODIMENTS

Overview

Figure 1:
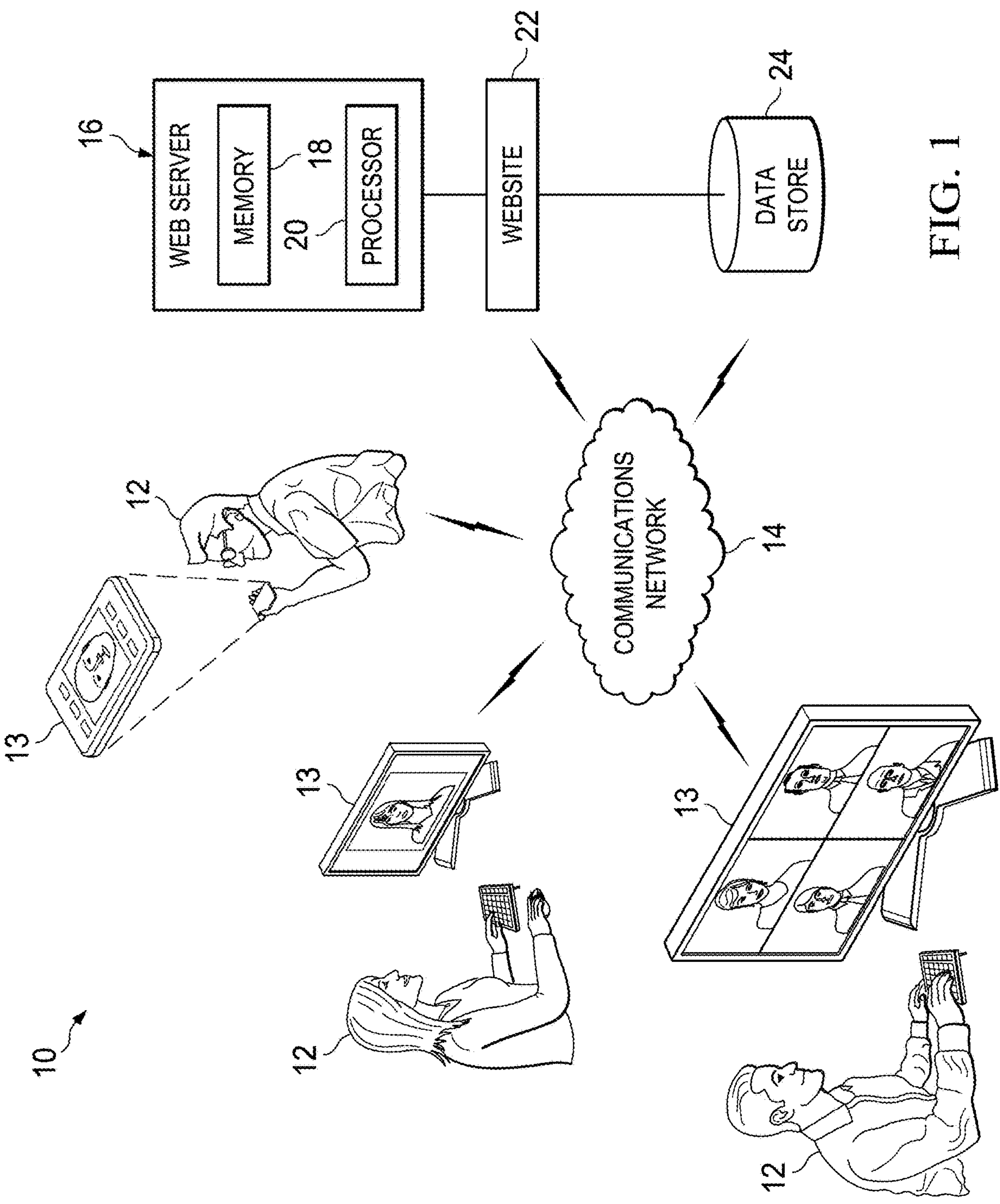
FIG. 1 is a network diagram showing an operating environment of the present disclosure, in accordance with one embodiment of the present disclosure.

Methods and systems for user communication in a network, online community, and/or website are provided. User profile data (or information derived from the user profile data) may be accessed to from a memory. An analysis system compares the user profile data for the user with a time-dependent goal to determine a result. For example, the time-dependent goal may include a number of communications initiated within a period of time. The comparing may be performed by an analysis system in a sliding time window. For example, comparing the user profile data for the user with the time-dependent goal may at a first point in time, comparing the user profile data for the user with the time-dependent goal within a first period of time; and at a second point in time, comparing the user profile data for the user with the time-dependent goal within a second period of time. In such an example, the second point in time may be subsequent to the first point in time.

The time-dependent goal may be determined based on an analysis of a set of (successful) users. Determining a user's performance against a time-dependent goal advantageously provides a benchmark for determining a degree of initiative taken by a user to seek out and proactively engage other users in communication over time, e.g., by initiating communication with other users (in some cases with no prompting by the other users).

The time-dependent goal may comprise more than one goal. For example, the time-dependent goal may comprise a first goal (e.g., short-term goal value) corresponding to a first period of time (e.g., a short period of time) and a second goal (e.g., a long-term goal value) corresponding to a second period of time (e.g., a long period of time). In one example, the short period of time is equal to about 7 days and the long period of time is equal to about 30 days. The period of time and/or the goals may relate to one another according to a ratio. For example, the short-term goal value may be equal to a predetermined percentage (e.g., 25% or 50%) of the long-term goal value. The short period of time may be equal to a predetermined percentage (e.g., 25%) the long period of time. Advantageously, a long-term goal may be divided into smaller, and more easily attainable, short-term goals thereby helping to motivate user while simultaneously reducing the likelihood of overwhelming them with a degree of difficulty of a long-term goal.

In an embodiment, a time-dependent goal, a number of communications initiated, a period of time, a short-term goal, a long-term goal, and/or any other information related to defining a goal are predetermined based on an analysis of user profile data for at least one further (successful) user.

A user interface system generates a representation of the result for prompting the user to initiate a communication to a different user based on the time-dependent goal. For example, the representation may comprise a metered representation indicating an amount of progress, by the user, toward the time-dependent goal. The user interface system may generate, in response to receiving a user selection of the representation, a further representation of the result for simultaneous display with the representation. For example, a user interface component containing a detailed bar graph of the result may drop-down or appear, in response to the user selection. The representation, the metered representation, and/or the further representation may include at least one of a message, a graph, a semicircular bar graph, a vertical bar graph, a horizontal bar graph, a meter, a button, text output, a completed percentage toward the time-dependent goal, or an audio signal. The user interface system may, in response to the user initiating a new communication, immediately update the representation to include data associated with the new communication.

In an online dating context, the user profile data for the user may comprise user profile data from a dating website. The user profile data for the user may be indicative of a dating interest of the user. For example, a communication (e.g., messaging, winking, liking, favoring), when sent from the user to the different user on a dating website, may be indicative of a positive dating interest of the user in the different user.

Example Embodiments

FIG. 1 is a network diagram showing an operating environment of the present disclosure, in accordance with one embodiment of the present disclosure. To illustrate the operating environment, FIG. 1 shows a simplified block diagram of an exemplary system 10 for providing an online dating service in a network environment. Although the present disclosure is described in the context of an online dating service, the disclosure is applicable to other but similar online communities or social networks utilizing the operating environment to provide a platform for end users. For instance, in other embodiments where communications or matching is valuable, systems 10 or 300 can be leveraged to identify and to evaluate suitable candidates in other contexts, e.g., hiring/employment, recruiting, real estate, general person searches, etc.

FIG. 1 includes multiple end users 12 and endpoints 13, a communications network 14, a (web) server 16 comprising memory 18 and at least one processor 20, a website 22 (or in some embodiments, an application), and a data store 24. Data store 24 may be any type of mechanism for storing data, including but not limited to one or more files, databases, memory devices, mass storage devices, data centers, etc. System 10, users 12 interact with web server 16 via endpoints 13, each of which comprises an appropriate user interface for interacting with web server 16 via website 22 for facilitating functions and features described herein. Generally, web server 16 is configured to provide output for the end user to consume at the end point. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10.

End users 12 may include a variety of types of end users, such as clients, customers, prospective customers, customer care agents, or entities wishing to participate in an online dating service and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data (or sometimes referred to as "information") as used herein in this document, refers to any type of numeric, voice, video, or script data, or any other suitable information in any appropriate format that may be communicated from one point to another.

End users 12 may access the aforementioned data via endpoints 13, which may be inclusive of devices used to perform various user activities, e.g., logging in, viewing a profile, initiating a communication, receiving communications/information from the server through an email/phone/messaging application, etc. Note that the broad term "user" or "end user" encompasses any type of node or user device, or any type of endpoint discussed herein. Additionally, the term "user" or "end user" can further include any type of profile to be used in the system discussed herein. Hence, the term "user" or "end user" can include (but is not limited to) elements such as a computer, a personal digital assistant (PDA), a laptop or electronic notebook, a cellular telephone, a mobile device, a tablet device, an IP telephone, an iPhone™, an iPad™, a Microsoft Surface™, an Android™ phone, a Google Nexus™, or any other device, component, element, or object capable of initiating voice, audio, or data exchanges within communication system 10. The endpoints may be inclusive of a suitable interface to the end user 12, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

A user may employ any device capable of operating as an endpoint 13 to connect to communications network 14 via wire, wireless, cellular, satellite link or other suitable interfaces. Web server 16, which as previously noted includes memory 18 and at least one processor 20, hosts website 22. Web server 16 has access to transmit and receive user or presence data (e.g., user profile data, user and/or user endpoint data, user contact data, etc.) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. Communications network 14 represents an Internet architecture in a particular embodiment of the present disclosure, which provides end users 12 with the ability to electronically execute or to initiate user actions associated with finding a potential match candidate. Alternatively, communications network 14 could be a plain old telephone system (POTS), which end user 12 could use to perform the same operations or functions. In some embodiments, communications network may be a mobile phone (cellular) network, which end user 12 could use to perform the same operations or functions via, e.g., Short Message Service (SMS) messages, Multimedia Messaging Service (MMS) messages, etc. Such transactions may be assisted by management associated with website 22 and/or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a computer server that is operable to receive and to communicate information to one or more end users 12. In a generic sense, (web) server 16 can implement a computer-implemented matching system that provides a framework/platform for suitable matching activities. Alternatively, web server 16 may be any switch, router, gateway, cache, server blade, software, processor, proprietary component, object, module, or element (or any combination of these) operable to facilitate communications involving end user 12. Web server 16 may be integrated with database 24 and/or website 22, where any one or more of these elements may share or otherwise coordinate the activities discussed herein.

In one particular embodiment, web server 16, via interaction with database 24 and/or in conjunction with website 22, is engaged in facilitating interaction(s) between parties interested in seeking a romantic partner (i.e., in an online dating scenario). For example, website 22 can be online dating service provider www.Match.com, www.Chemistry.com, or any other suitable provider. In certain example scenarios, a given end user may pay a fee for a subscription-based service. Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 (or one or more applications) is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, application, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, messaging text reminders, direct mailings, etc. It can be appreciated that online commerce can be generated by a plethora of marketing tools and any such tools can readily cooperate with the operations of the present disclosure.

At this point, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-2J illustrate example screen shots that may be provided in the online dating process to facilitate presentation of information to and gathering of information from (member) end users to form a user profile. FIGS. 2A-2J also illustrates exemplary user activity of an end user on the website. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2A:
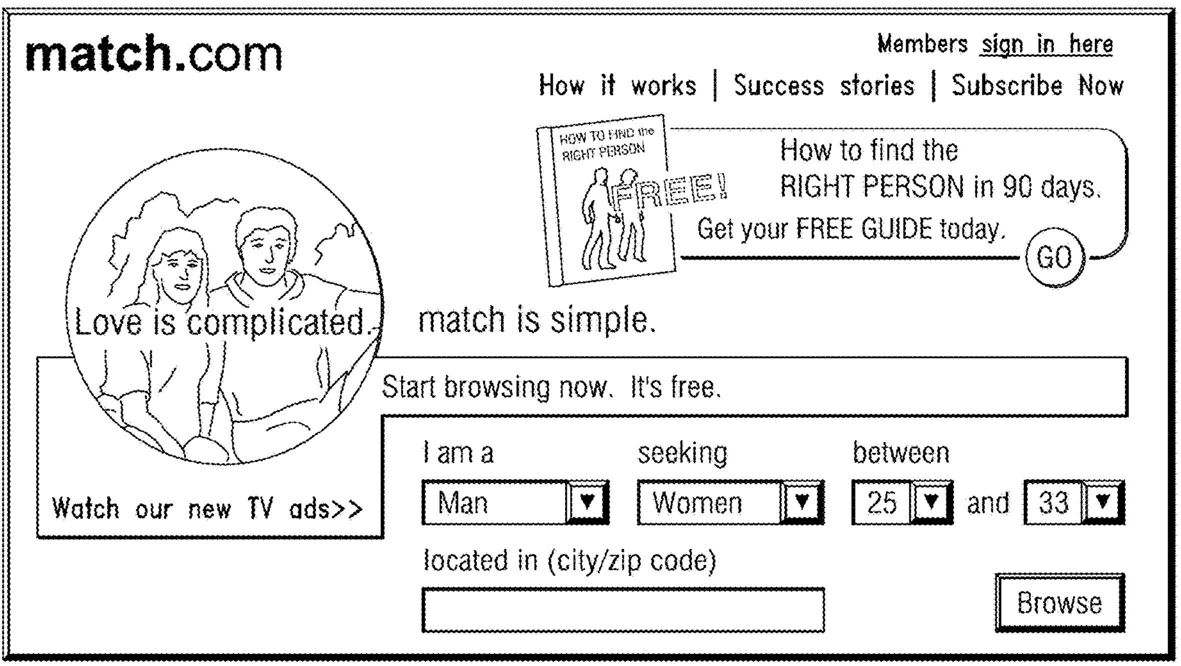
Figure 2B:
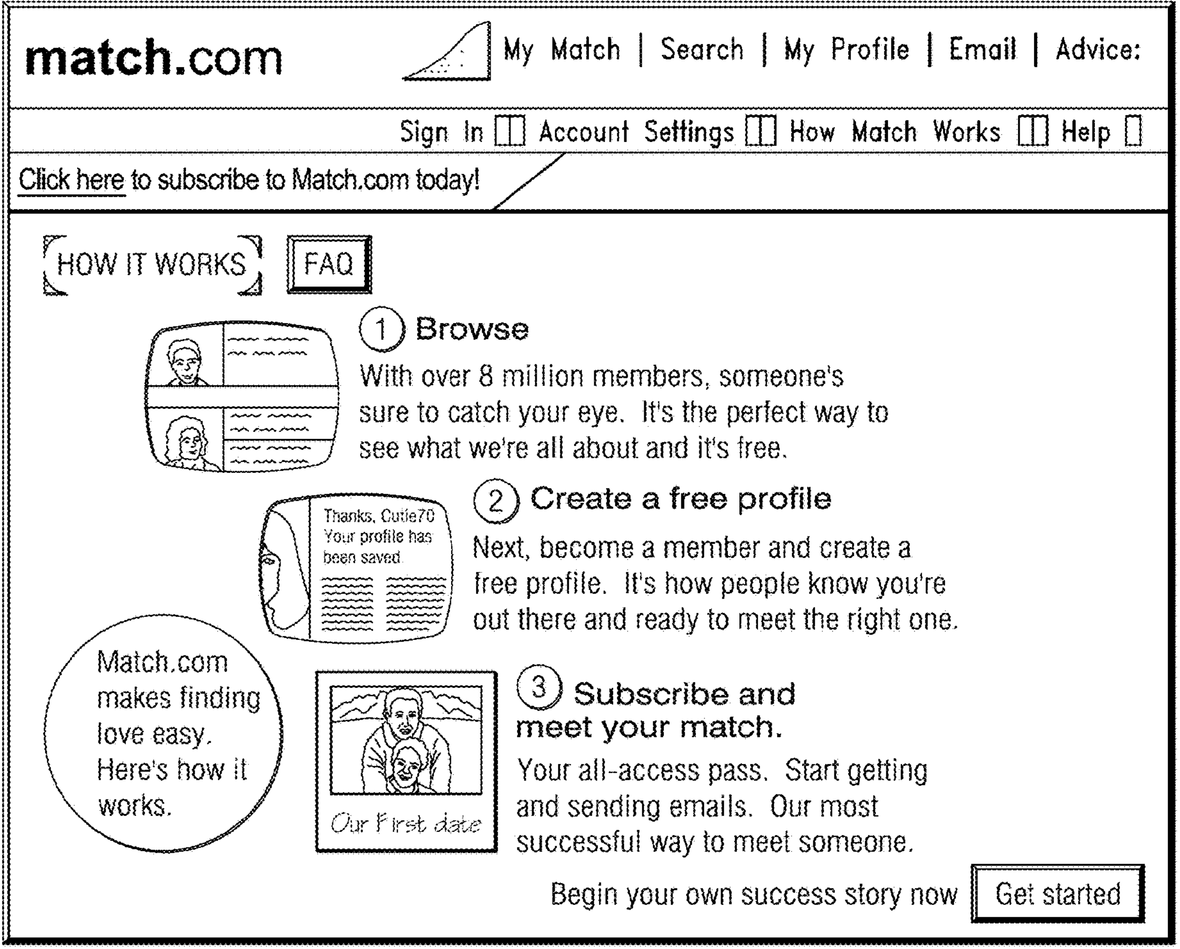

FIG. 2A is an example screen shot of a web page from which an interested end user may begin his/her journey. In the illustrated example, the web page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the web page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view profile photos of members along with summaries of the members' profiles. After browsing the website, the end user may decide to create a free user profile. Once the end user browses the website and creates a user profile, the end user may opt to subscribe to the service and receive information from/about others who are part of the online community. For purposes of example and ease of explanation, it will be assumed for the remainder of the discussion of FIGS. 2A-2D that the potential new end user investigating and ultimately subscribing to the service is a male end user named "Tom" who is interested in finding a female match.

Figure 2C:
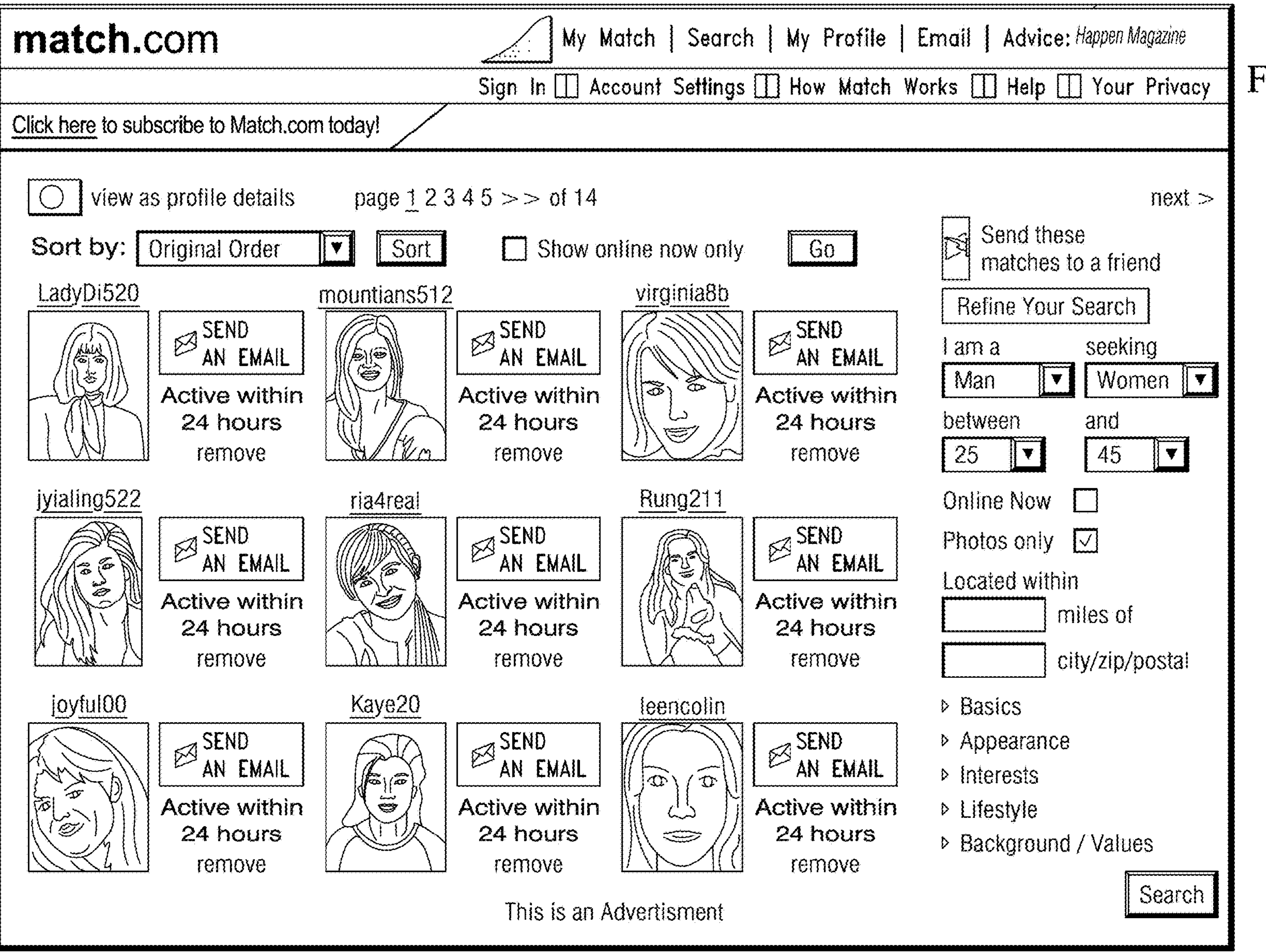
Figure 2D:
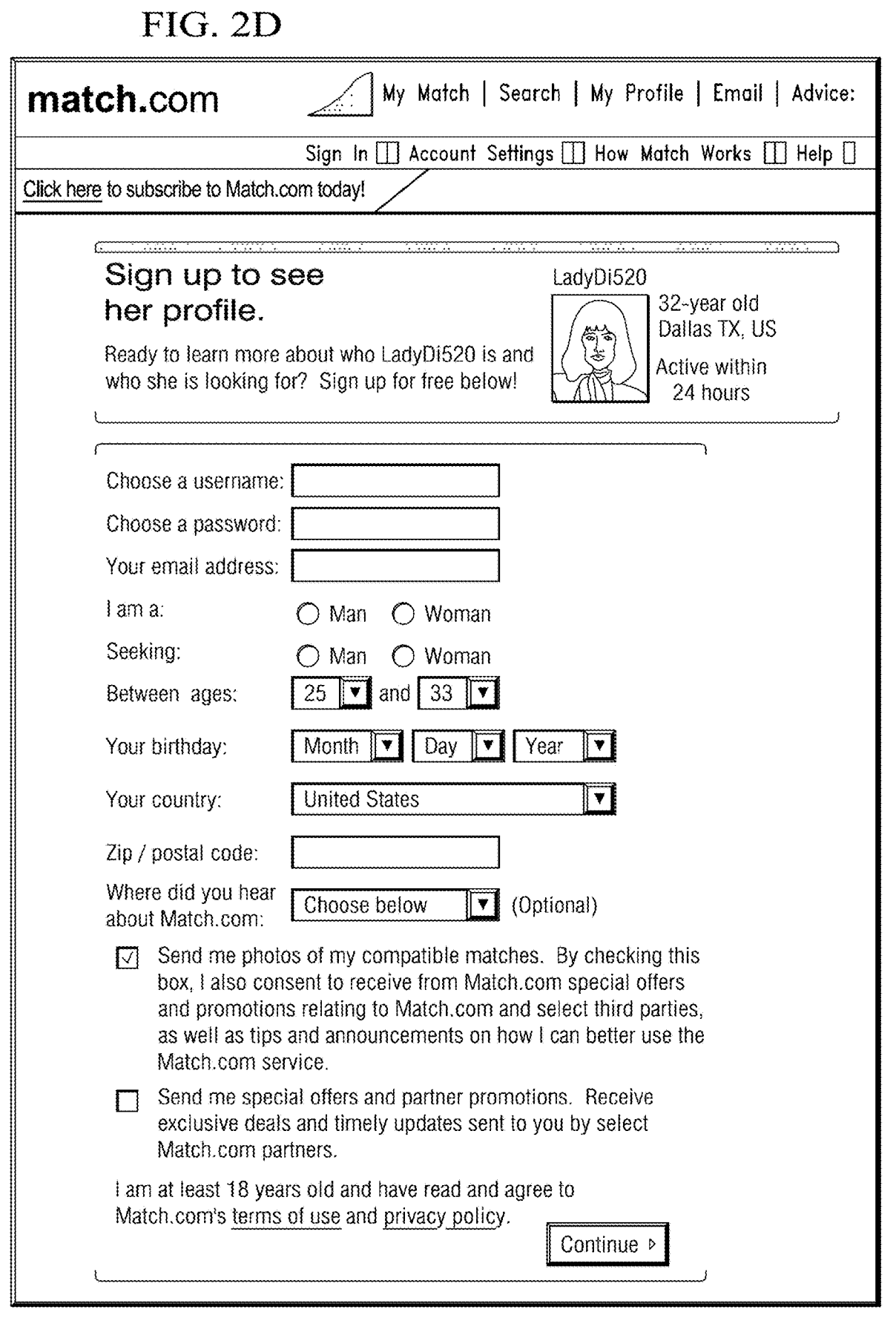

FIG. 2C is an example screen shot of a number of user profiles (in this case, profile photos, user names, last-active information) that may be viewed by Tom during the browsing phase described above. In the context of this screen shot, Tom may be simply browsing. Assuming Tom has decided he would like to know more about one of the members whose user profile is presented in FIG. 2C, he may click on the profile photo associated with the selected user profile. For example, assuming Tom has decided he would like more information about user with user name "LadyDi520", clicking on her picture results in his being directed to a web page as shown in FIG. 2D, where he is solicited to sign up for the online dating subscription such that he can effectively contact his candidate selection. It will be noted that the information solicited for a user profile using the page shown in FIG. 2C may be used in selecting matches for Tom. The information may also be displayed on Tom's profile page or summary thereof presented to other users to assist those users in determining whether they are interested in interacting with him.

Figure 2F:
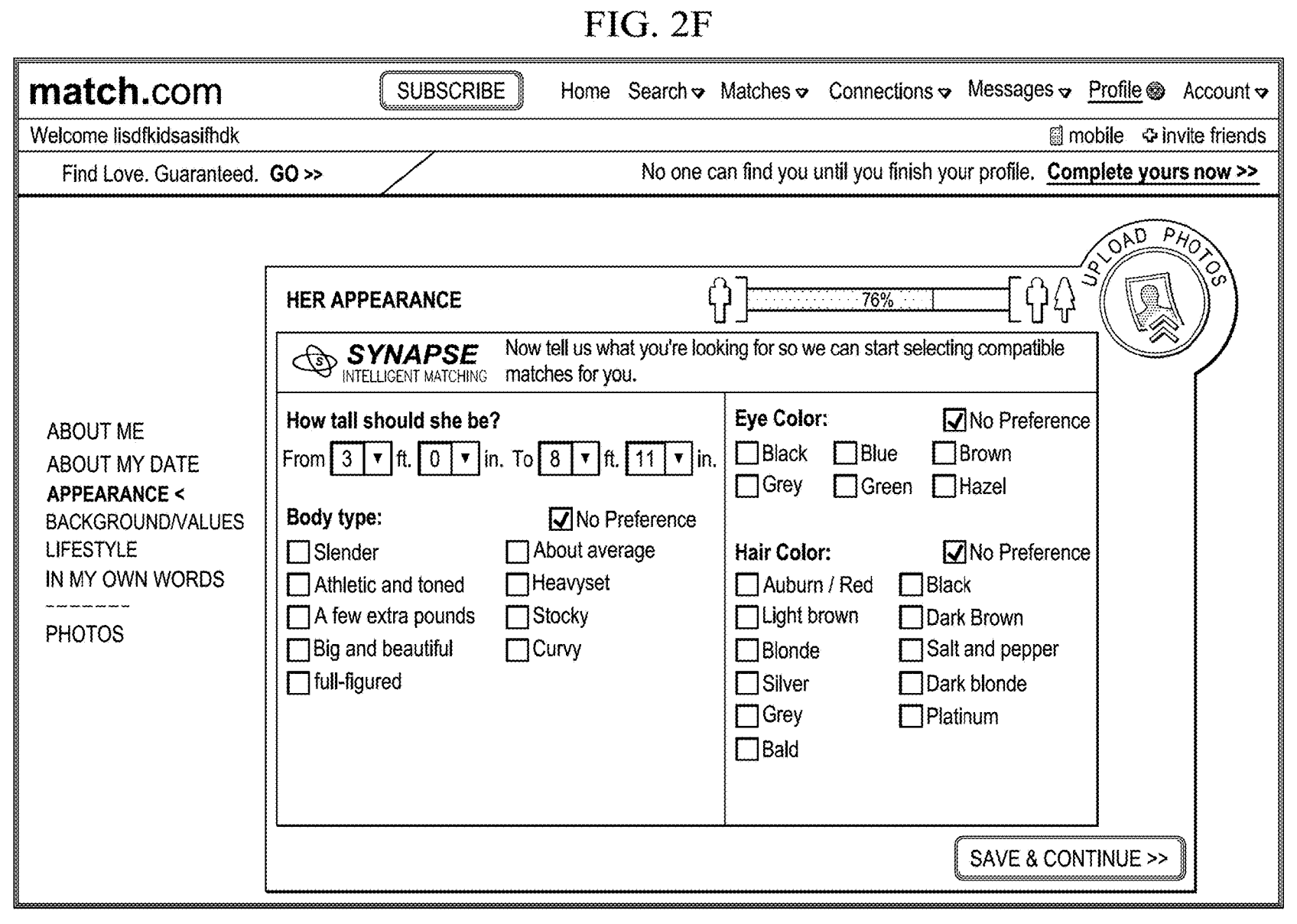

FIGS. 2E-2G illustrate various screen shots comprising a user information collection process, i.e., for collecting information for populating a user profile in accordance with one embodiment. Using the web pages illustrated in FIGS. 2E-2G, system 10 collects a variety of information from an end user, including, but not limited to, basic information about the end user (FIG. 2E), search criteria for matches (FIG. 2E), as well as information about the type person the end user would be interested in dating, including information about a potential date's physical appearance (FIG. 2F) and background and values (FIG. 2G). System 10 may also ask the user to upload one or more photos for the user profile. It will be recognized that the information collected using the web pages illustrated in FIGS. 2E-2G is illustrative only and that any type/amount of information for a user profile may be solicited in the illustrated manner.

FIGS. 2H-2J are example screen shots of the full user profile of LadyDi520, the end user corresponding to the picture Tom selected while browsing. In the illustrated user profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. The profile may include one or more photos, biographical information (e.g., gender, age, location, relationship status, etc.), physical information (e.g., height, weight, hair and eye color, etc.), interests (e.g., hobbies, "favorites," etc.), lifestyle information (e.g., exercise habits, employment, smoking/drinking habits, etc.), and background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In some embodiments, a full profile, including the profile information provided by the end user and stored in the system, is displayed to interested viewers; in other embodiments, only a summary or subset of the profile information is displayed.

Subsequent to completing a user profile and browsing profiles of potential matches, a user may desire to interact with some of the potential matches in the online community. There are many ways for users to interact with one another. For example, a user may initiate and/or receive any of the following (direct or indirect) communications: winks, emails, likes, add as a favorite, instant messages, calls (e.g., telephone call), letters (e.g., hand-written letter send by ground mail), invitation to attend a live event, invitation to attend a date.

Given the number of choices for interacting with other users, some users may be unsure of which actions (e.g., types of communications to use, what number of messages to send, rate at which to send messages) to take to be a successful member of the online community. In addition, without any information or feedback on what it takes to be successful, a user may not know how to adjust their level of interaction with other users to improve the likelihood of the user being successful.

A system for user communication in an online community (e.g., a website), according to the present disclosure, may advantageously improve the likelihood of a user being successful by providing, to an end user, goals based on analysis of a set of successful users. In addition, a system according to the present disclosure may provide time-dependent goals in a plurality of time windows (e.g., short-term goal as a long-term goal). Advantageously, a long-term goal may be divided into smaller, and more easily attainable, short-term goals thereby helping to motivate user while simultaneously reducing the likelihood of overwhelming them with a degree of difficulty of a long-term goal. A goal is distinguished from an indication of, e.g., how the user can modify their profile to (passively) attract other users or to increase a number of potential matches. In an embodiment, a goal is a benchmark for determining a degree of initiative taken by a user to seek out and proactively engage other users in communication over time, e.g., by initiating communication with other users (in some cases with no prompting by the other users).

Figure 3:
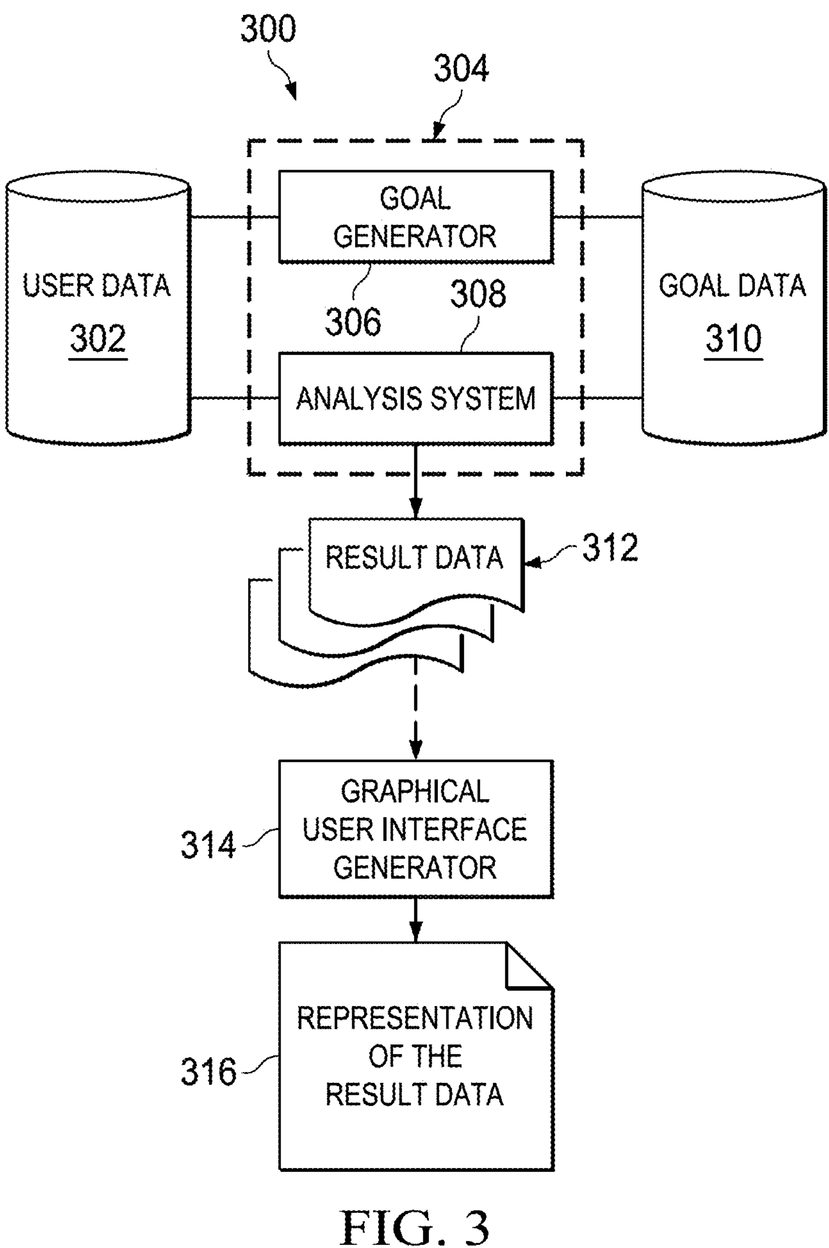
FIG. 3 is a simplified diagram of an embodiment of a system for user communication on a website according to the present disclosure.

FIG. 3 is a simplified diagram of system 300, which is an embodiment of a system for user communication on a website according to the present disclosure. In system 300, performance measurement system 304, user data store 302, goal data store 310, and graphical user interface generator 314 are coupled (e.g., for one-way or two-way communications network) to one another. Performance measurement system 304 comprises goal generator 306 and analysis system 308. Goal generator 306 generates goals (benchmarks, etc.) based on data in user data store 302 and/or from other data stores (not shown). Performance measurement system 304 generates result data 312 by analysis system 308. Graphical user interface generator 314 accesses result data 312 and generates a representation of the result 316. In certain implementations, performance measurement system 304 and graphical user interface generator 314 are consolidated into a single component, physical structure, equipment, etc.

User data store 302 and/or goal data store 310 may be any type of mechanism for storing data, including but not limited to one or more files, databases, memory devices, mass storage devices, data centers, etc. In an implementation, the data stored in user data store may comprise, e.g., user profile data, user activity logs, user calendar data, user phone records, user SMS text records, user location data, etc.

In an implementation, goal generator 306 may generate goals based on data for successful users (e.g., successful users identified as discussed herein), which may be stored in user data store 302 and/or retrieved from other data stores. The generated goals may be stored in and/or retrieved from goal data store 310. Analysis system 308 may analyze data for end users (e.g., users other than the successful users) against goals in goal data store 310 to generate result data 312 (e.g., a result indicating that a user has completed 25% of a goal to send 5 emails within a 7-day time period). Result data 312 may comprise one or more of a numerical value, a file, a function, etc. Graphical user interface generator 314 may comprise any mechanism for generating a graphical user interface, including but not limited to one or more application programming interfaces, or any combination of hardware and/or software for generating graphics. Representation of the result 316 may be any mechanism for representing the result data, including but not limited to one or more graphical user interface components, text, shapes, icons, graphical progress bars, bar graphs, pie graphs, line graphs, pie graphs, histograms, a meter, a metered representation, a virtual "meter" indicating an amount of progress toward a goal, a graphical representation that is visually similar to a gas meter ranging from zero to one or from Empty ("E") to Full ("F"), etc. Goals for implementing in such a system (e.g., goals in data store 310) may be determined by performing analysis on successful users.

FIG. 4 illustrates exemplary logic or a method for determining goals according to an embodiment of the present disclosure. Logic 400 comprises start point 402, identify a set of users 404, analyze data associated with the set 406, determine time-dependent goal(s) based on the analysis 408, and end point 410. Logic 400 is an exemplary implementation of logic to analyze a set of successful users in an online community to determine goals. Logic 400 begins at start point 402. Start point 402 may coincide with a start or end point of other logic, routines, and/or applications. In addition, at start point 402, data (e.g., objects, values, variables, etc.) may be initialized, retrieved, or accessed for use in logic 400. At procedure 404, a set of users is identified by a goal system (e.g., goal generator 306). The set of users may possess or not possess certain characteristics, which may be determined (e.g., searched or filtered) as criteria for identifying the users. In one example, a characteristic may be a predefined level of success in an online dating environment. In such a case, the set of successful users may be identified based on receipt of a plurality of messages indicating a degree of success for each of the set of users. The users may identify themselves (e.g., providing a user input indicating a degree of success) as successful and/or may be identified by others as being successful. In other examples, a successful user may be identified based, or example, one or more of a survey regarding a user's level of success (either provided by the user or by another user), a number of completed dates, a number of positive reviews by other users in the online community, etc.

At procedure 406, data associated with the set of users is analyzed, e.g., by a goal generator. The analysis techniques may include but are not limited to one or more of statistical analysis, machine learning, pattern recognition, neural networks, hidden Markov models, etc. The analysis may identify patterns and/or trends in the data associated with the set of users. In an implementation, the analysis may determine patterns and/or trends in rates of communication (e.g., number(s) of communications sent over a period of time) for the set of users.

At procedure 408, time-dependent goal(s) are determined, e.g., by a goal generator, based on the analysis performed at procedure 406. In an implementation, the time-dependent goals may comprise ore or more of patterns, trends, averages, maximum, and minimums, rates of communication (e.g., a number of communications within a time period) based on the analysis of the data for the set of users. Statistics associated with the set of users (e.g., successful users) may be used as goals for users (which may or may not include the set of users). An exemplary statistic may be that male users in a set of users in an online dating community send an average of 100 emails in a 30-day period of time. This statistic may in turn be used as a goal for other male users, for whom the goal is to send 100 emails in a 30-day period of time. Logic 400 ends at end point. End point 410 may coincide with a start/end point of other logic, routines, and/or applications (e.g., start point 502, start point 602). Logic 400 may be implemented in any component or combination of components of systems 10 or 300. In one implementation, logic 400 may be provisioned in whole or in part in goal generator 306 (FIG. 3).

Statistical analysis was performed on a set of successful users (e.g., identified at procedure 404, FIG. 4) in an online community to determine goals. Each user in the set of successful users sent an unsolicited message to management associated with an online community, self-identified as being happy with their level of success, as being successful, and/or as having had a positive experience as a member of the online community. The set of users was identified based on receipt of a message indicating a degree of success. In this example, users with an excessively high level of interaction (i.e., a statistical outlier with respect to a number of communications initiated) were excluded from the set of successful users. This exclusion reduced the likelihood that the set of successful users included indiscriminate users who may send an excessively large number of messages solely to increase the chance of getting a response from anyone.

Analysis was performed (e.g., at procedure 406, FIG. 4) on the user profile data for the set of successful users using a plurality of sliding time windows, where a period of time of a fixed size (i.e., a time window) is incrementally moved (i.e., slid) in time. For example, a sliding time window can be a 30-day period of time, a 28-day period of time, and 7-day period of time. The aforementioned lengths of time are non-limiting non-exhaustive examples of sliding time windows. The time windows may be any length of time in which user data can be analyzed. In an implementation, a sliding time window can be measured in seconds, minutes, hours, days, years, or any combination and/or multiple thereof. The analysis focused on communications initiated by the successful users, since these are activities for which the user has control.

Statistical analysis performed (e.g., at procedure 406, FIG. 4) on user profile data for each of the users in the set of successful users yielded non-trivial results. Several patterns were determined based on the analysis of the number and types of communications initiated by successful users. One result of the analysis is that, successful users initiate a relatively larger number of communications immediately preceding finding a successful match, after which the number of communications sharply declines. Another result is that, the average number of communications sent by a successful man is about 50% more than the average number of communications sent by a successful woman. Another result is that, the number of communications initiated by successful user is time-dependent. For example, the usage (e.g., number of communications initiated) in a first time period and usage within a subset of the time period relate to one another according to a ratio (or percentage). For example, if a male user sent 19 likes in a 30-day time period, then 10 likes of the 20 likes were sent in a 7-day time period (i.e., a 7-day period within the 30-day time period). Thus, the usage within 7-daytime period is equal to about 50% of the 30-day usage. In another example, if a female user added 4 users as favorites in a 30-day time period, then 1 of the favorites (i.e., 25% of the favorites) were sent in a 7-day time period. Assuming that a first (short) time period is a subset of a second (long) time period. Another finding is that if the first time period is equal to about 25% of the second time period, then the number of communications initiated in the first period of time is equal to 50% of the number of communications initiated in the second period of time. In other words, a ratio of an amount of communication in the first (short) time period to an amount of communication in the second period of time is disproportionately large compared to a ratio of the first (short) time period to the second (long) time period. In addition, the following statistics were determined from the analysis the set of successful users:

An maximum peak 30-day usage for the set of successful users,

An average peak 30-day usage for the set of successful users,

An average peak 30-day usage for male users within the set of successful users,

An average peak 7-day usage for male users within the set of successful users,

An average peak 30-day usage for female users within the set of successful users, An average peak 7-day usage for female users within the set of successful users.

For the results and statistics, the usage included the number of communications initiated by the user(s) in the analysis. Each of the results and statistics were further determined for each of a plurality of types of communication (e.g., winks, likes, emails, favorites, etc.) in the online network.

Goals for users in the online community can be generated based on the results and/or statistics from analysis of the successful users (e.g., at procedure 408, FIG. 4). In one example, the goals are the direct results and/or statistics determined from an analysis of the successful users. In other examples, the goals may be derived from results and/or statistics determined from an analysis of the successful users. For example, an average peak number of communications initiated by male users, in the set of successful users, within a 30-day (one month) time period may divided by 4 to determine a 7-day goal (e.g., because one month divided by four equals about one week, or seven days). A 30-day (one month) goal may be divided into smaller, and more easily attainable, 7-day goals to advantageously reduce the likelihood of overwhelming an end user with a degree of difficulty of the 30-day goal.

Goals may be generated (e.g., at procedure 408, FIG. 4) based on the communication patterns of a set of users (e.g., a set of successful users). The following is a non-exhaustive non-limiting list of exemplary list of goals:

Does the user initiate X number of communications?

Does the user initiate X number of communications in a Y-day period of time?

Does the user initiate, in a Y-day period of time, X number of communications to users with whom the user has not previously communicated?

Does the user initiate, in a Y-day period of time, X number of communications to users that are new to an online dating community?

Does the user initiate X number of winks in a Y-day period of time?

Does the user initiate X number of likes in a Y-day period of time?

Does the user initiate X number of emails in a Y-day period of time?

Does the user add X number of users as favorites in a Y-day period of time?

Does the user initiate X number of phone calls in a Y-day period of time?

Does the user initiate X number of instant messages in a Y-day period of time?

Does the user send X number of letters (e.g., a hand-written note deliver by ground mail) in a Y-day period of time?

Does the user send X number of (virtual and/or physical) gifts in a Y-day period of time?

Does the user attend X number of live events in a Y-day period of time?

Does the user invite X number of users on one-on-one dates in a Y-day period of time?

Does the user attend X number of one-on-one dates in a Y-day period of time?

Does the user's X number of communications initiated in a Y-day period of time and the user's M number of communications initiated in a N-day period relate to one another according to a predetermined percentage between the numbers of communications (e.g., the value of M/N)?

Figure 7:
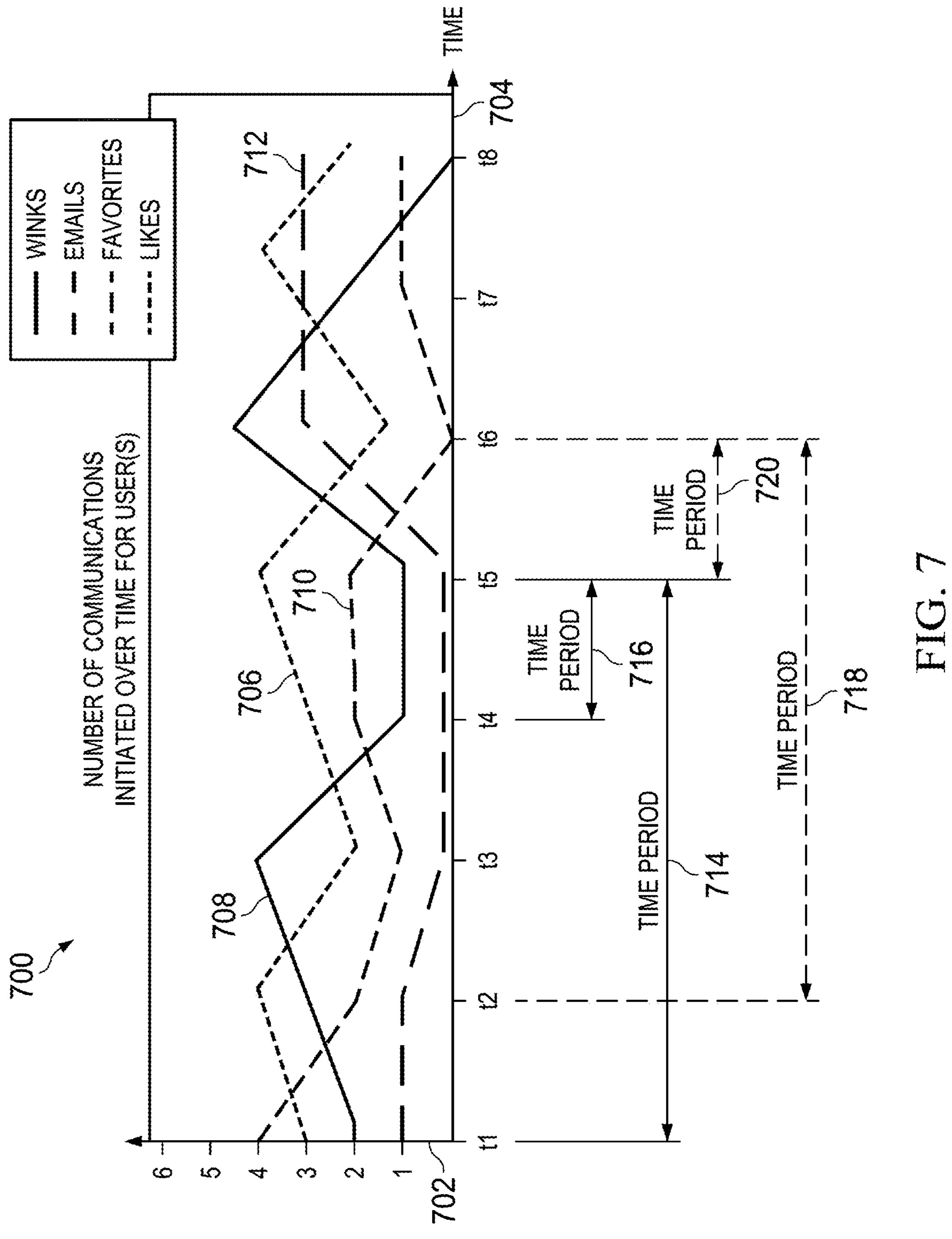
FIG. 7 illustrates an exemplary graph of user profile data and sliding time windows in which the data are analyzed.

A user's performance of the goal(s) may be analyzed within the context of an online dating system (i.e., does the user initiate communications to others within the online community). For example, user profile data from an online dating website may accessed by an analysis system (e.g., analysis system 308) for comparison to the goals. FIG. 7 illustrates an exemplary graph (i.e., graph 700) of user profile data and sliding time windows in which the data are analyzed. Graph 700 comprises vertical axis 702, horizontal axis 704, like data 706, wink data 708, favorite data 710, and email data 712. Vertical axis 702 corresponds to a number of communications initiated by a user. Horizontal axis 704 corresponds to times at which communications are initiated. Like data 706, wink data 708, favorites data 710, and email data 712 show varying numbers of communications initiated over time for a user(s). Like data 706 represents numbers, varying in time, of likes initiated by a user. Wink data 708 represents numbers, varying in time, of winks initiated by the user. Favorite data 710 represents numbers, varying in time, of favorites initiated by the user. Email data 712 represents numbers, varying in time, of emails initiated by the user.

Time periods 714, 716, 718, and 720 are time periods (or time windows, time frames, etc.) in which the data in graph 700 are analyzed. Time period 714 spans from time t1 to time t5 and thus spans (5−1=4) 4 units of time. Time period 716 spans from time t4 to time t5 and thus spans 1 unit of time. Time period 718 spans from time t2 to time t6 and thus spans 4 units of time. Time period 720 spans from time t5 to time t6 and thus spans 1 unit of time. In an implementation, a long time period (e.g., time periods 714 and 718) may be equal to one of 1 month, 30 days, or 28 days. A short time period (e.g., time periods 716 and 720) may be equal to one of 1 week, 7 days, or 7.5 days. In another embodiment, the length of any time period (i.e., long and/or short time periods) may be determined based on analysis performed on the data (e.g., to determine a length of a period associated with a periodic or cyclical activity trend for the user).

At a point in time, the data may be simultaneously analyzed in a plurality of time periods. In this example, at time t5, the data are simultaneously analyzed in time period 714 and time period 716. The results of the analysis of the user profile data may relate to one or both time periods and may determine relationships between data in the two time periods (e.g., data in time period 714 and data in time period 716). Subsequent to analysis at time t5, an analysis system may move (or "slide") a time window in which analysis is performed to a different point in time (e.g., time t6).

The time periods in which analysis is performed may slide (e.g., a time window that slides) such that they are measured relative to a current date and/or time (e.g., measured from a current date back to 7 days prior to the current data, i.e., looking backward in time). In other words, a time window may move from time-to-time (e.g., day-to-day, hour-to-hour). In this example, a long time window slides from time period 714 to time period 718 and a short time window slides from time period 716 to time period 720. At time t6, the data are analyzed in time period 718 and time period 720, which have moved forward one time unit relative to time periods 714 and 716, respectively.

After defining goals (e.g., using logic 400) and accessing user data (e.g., as discussed with reference to FIG. 7), user profile data are compared to goals in one or more time periods, e.g., using an analysis system. The analysis may comprise comparing the users profile data to a time-dependent goal. FIG. 5 illustrates exemplary logic or a method for comparing user data to a goal according to an embodiment of the present disclosure. Logic 500 comprises start point 500, access data associated with user(s) 504, compare the data with a time-dependent goal(s) 506, determine a result based on the comparison 508, and end point 510. Logic 500 begins at start point 502. Start point 502 may coincide with a start or end point of other logic, routines, and/or applications. In addition, at start point 502, data (e.g., objects, values, variables, etc.) may be initialized, retrieved, or accessed for use in logic 500.

At procedure 504, data associated with a user (or multiple users) is accessed, e.g., using an analysis system. Accessing the data may comprise any of receiving, retrieving, reading from a memory, analyzing (e.g., using methods similar to those utilized in procedure 406 of logic 400), and/or manipulating the data (e.g., user profile data). For example, user profile data for a user may be analyzed to determine a number of winks sent in an online dating community within a predetermined period of time.

At procedure 506, the data from procedure 504 is compared (e.g., using an analysis system) with time-dependent goal(s). The time-dependent goal(s) may be determined from an analysis of data from an individual successful user and/or a group of successful users and thus are based on a proven pattern of communication that corresponds with success for a user. For example, the time-dependent goal(s) may be determined using logic 400. The comparison may comprise accessing the time-dependent goal(s) from a data store of predetermined goals. In an embodiment, the time-dependent goal(s) may be determined as a part of the procedure 506. The comparison may include verifying a unit of measure for two or more values being compared or analyzed. In some embodiments, the unit of measure may be converted such that the two or more values being compared are in the same unit of measure. For example, an analysis system may covert a percentage (50% of 100 emails) to a count (50 emails) for comparison to another count (105 emails).

At procedure 508, a result is determined (e.g., by an analysis system) based on the comparison that was performed at procedure 506. In an implementation, the result may include but is not limited to one or more of a Boolean (e.g., indicating of whether the user (or users) have satisfied the goal(s)), a value (e.g., indicating a degree to which the user(s) have (or have not) completed the goal(s)), a message (e.g., a message to the user or to a system component indicating whether the goal was met), a function call (e.g., to conditionally activate a system or function based on the comparison), and/or modifying a memory (e.g., storing result data in a memory, changing a state variable in memory). The determined result, as well as other data, may be output (e.g., to one or more interface systems, one or more third party systems, etc.).

Logic 500 ends at end point 510. End point 510 may coincide with a start/end point of other logic, routines, and/or applications (e.g., start point 602, start point 402). In one implementation, logic 500 may be provisioned in any component or combination of components of systems 10 or 300. For example, logic 500 can be implemented in whole or part in analysis system 308. In such an implementation, the result determined at procedure 508 may correspond to result data 312.

It is noted that a goal (e.g., a time-dependent goal) as described herein includes and/or relates to a benchmark for a degree of initiative taken by a user to seek out and proactively engage other users in communication over time. The goals are distinguished from generic goals or metrics, which may determine whether a user has provided complete data for their profile. Moreover, the goals as described herein are further distinguished from some specific goals or metrics, which may relate to how a user can modify their profile to (passively) attract other users or to increase a number of potential matches. In contrast, the goals as described herein include relate to prompting users to proactively communicate (e.g., to initiate a communication) with other users and encouraging them to sustain the proactive communication activity over time to meet a plurality time-dependent benchmarks. In some embodiments, a goal may measure a number of communications initiated by a user to other users with whom the user has not previously communicated (e.g., has neither sent a communication to nor received a communication from the other users). The goals may be used to prompt the user to initiate communications with other users with whom the user has not previously communicated.

Subsequent to determining a result of comparing user data to a goal, a representation (e.g., a graphical representation) of the result may be generated (e.g., using a user interface system). For example, FIG. 6 illustrates exemplary logic or a method for generating a representation of a result of comparing user data to a goal according to an embodiment of the present disclosure. Logic 600 comprises start point 602; receiving a result of comparing user data with goal(s) 604; generating, based on the result, message(s) to prompt the user(s) to initiate communication 606, generate graphical output based on the result 608, and end point 610. Logic 600 begins at start point 602. Start point 602 may coincide with a start or end point of other logic, routines, and/or applications. In addition, at start point 602, data (e.g., objects, values, variables, etc.) may be initialized, retrieved, or accessed for use in logic 600.

At procedure 604, a result of comparing user data with one or more goals is received (e.g., by a user interface system). In an implementation, the result may be received directly from a system that generated the result, from third-party, and/or from a data store containing the result. In other implementations, analysis may be performed, at procedure 604, to determine information from the result or a set of results (e.g., perform statistical analysis on results gathered over one year to determine a trend in a user's communication data).

A representation of the result, received at procedure 604, may comprise a message (e.g., generated at procedure 606), a graphical output (e.g., generated at procedure 608), and/or and any mechanism as described for representation 316.

At procedure 606, one or more messages are generated, based on the result, to prompt the user(s) to initiate communication. The one or more messages are distinguished from messages that encourage a user to change their profile or activity to (passively) attract other users or to increase a number of potential matches. The one or more messages described herein prompt users to proactively communicate (e.g., to initiate a communication) with other users based on a time-dependent goal from analysis of successful users. The messages may be transmitted directly to the user or may be transmitted to system component or third-party for further processing.

At procedure 608, a graphical output is generated based on the result. In an implementation, the representation may be any mechanism as described for representation 316. A graphical output (e.g., a bar graph for a time period) may be utilized to encourage a user to sustain the proactive communication activity over time to meet one or more time-dependent goals. The graphical output may visually convey action that the user can initiate to increase the likelihood of being successful. In contrast to graphical output indicating how a user may change their profile, search criteria, or responsiveness to communications initiated by others, the graphical output described herein prompts users to proactively initiate communications (e.g., winks, favorites, emails, likes). In some implementations, the graphical output may encourage a user to initiate a communication to another user with whom the user has not previously communicated (e.g., encouraging the user to meet new users). The graphical output described herein can provide visual feedback on a level of communication and whether a user's level of communication matches that of a successful user. The graphical output goes beyond more than merely encourage high numbers of communications, instead it may provide (and thereby encourage) numbers of communications that correspond to numbers of communications for successful user(s). The numbers of communications may vary based on, e.g., the type of communication and/or a gender of the user. In an implementation, the graphical output is a graph of the user's communication data compared to a time-dependent goal. The graphical output may be interactive. For example, the graphical output may include the following text, "you need to send 5 more winks in the next 7 days"; clicking the text can take the user to an interface where they could send a wink. In an implementation, upon the user completing all of the goals, the graphical output may include the following text, "Congratulations, you are meeting all of your goals".

Logic 600 ends at end point 610. End point 610 may coincide with a start/end point of other logic, routines, and/or applications (e.g., start point 402, start point 502). Logic 600 may be implemented in any component or combination of components of systems 10 or 300. In one implementation, logic 600 may be provisioned in whole or in part in graphical user interface generator 314 (FIG. 3). In such an implementation, the message(s) and/or graphics provided at procedures 606 and 608, respectively, may correspond to representation 316.

FIGS. 8A-8D illustrate example screen shots that may be provided in an online dating process to facilitate presentation of information to and receiving input from users to facilitate communication on a website. FIGS. 8A-8D also illustrates exemplary user activity of a user on the website.

The logic in any of FIGS. 4, 5, and/or 6 may be combined in any fashion. For example, logic 400 may be executed by a processor, which then executes logic 500, and finally logic 600. The logic (i.e., logic 400, 500, and/or 600) may be used in an iterative fashion. For example, after determining time dependent goals (based on Logic 400) and comparing user data with the time-dependent goals (based on Logic 500), a processor may again execute the logic 400 (i.e., literately apply logic 400) to redefine the goals (e.g., based on an analysis of the results, for example, upon determining that too few users meet the goals or upon determining that the goals are too challenging, etc.).

Figure 8A:
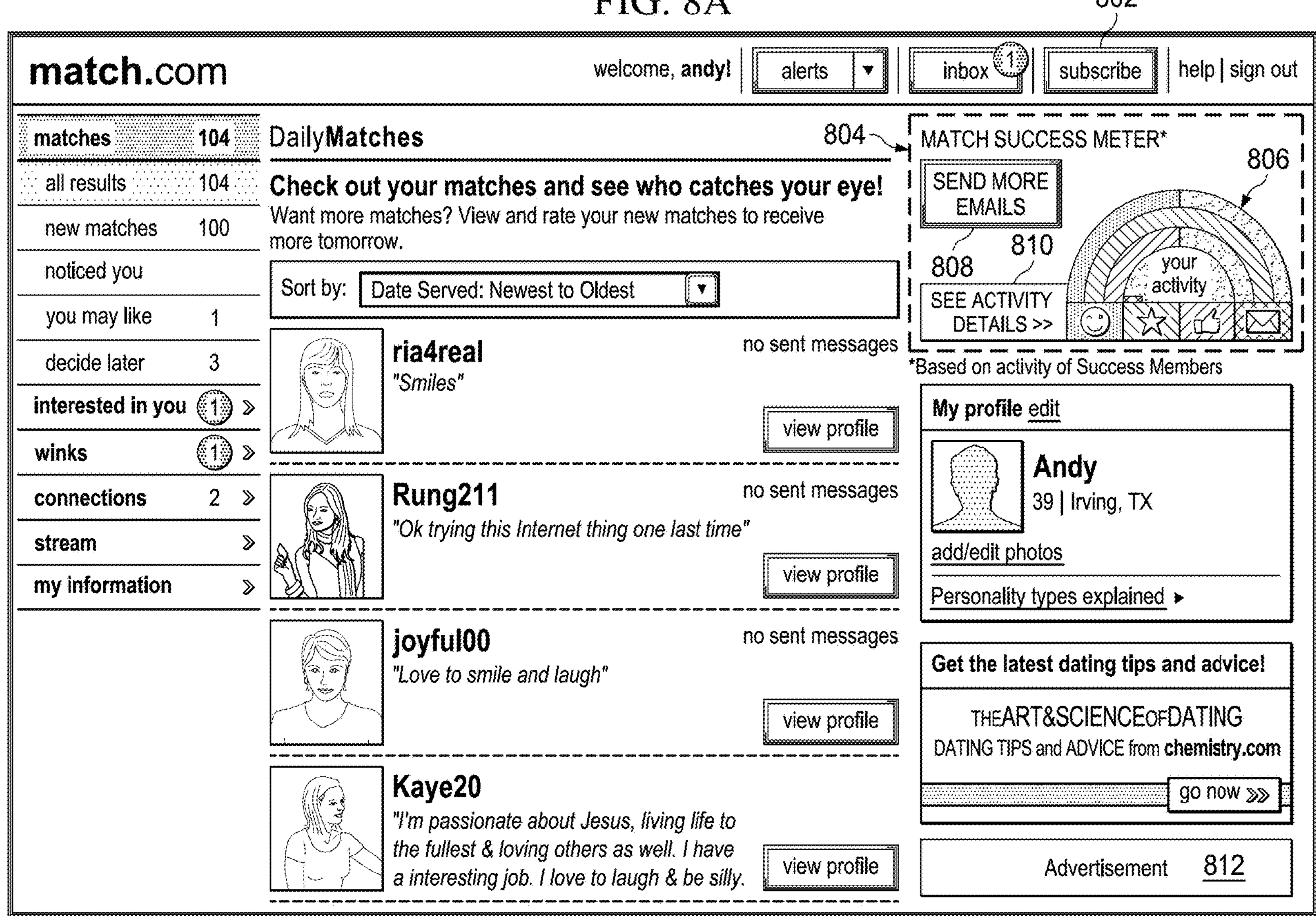

In FIG. 8A, a user, i.e., "Andy", is logged into match.com. The website includes a list of candidate matches (e.g., the list of users titled "DailyMatches") for the user. The list of candidate matches includes at least the users "ria4real", "Rung211", "joyful00", and "Kaye20". The user may select a user interface component (e.g., a "view profile" button) to view a profile of any of the users in the list of candidate matches. Each of the users ria4real, Rung211, and joyful00 is a candidate match with whom the user has not previously communicated, e.g., as indicated by the label "no sent messages". The user (i.e., Andy) has communicated with Kaye20 thus the label "no sent messages" is not indicated for Kaye20. In an embodiment, the user interface may output a message prompting the user to initiate a communication to users with whom the user has not previously communicated, which in this example includes the user Kaye20. In addition to the above, the website further comprises button 802, user interface component 804, and advertisement 812. The user is a member (e.g., has created a free profile) of the website but is not a subscriber (e.g., has not paid a current fee for a subscription-based service) of the website. Button 802, when selected by the user, may take the user to a page to allow the user to subscribe to the website. User interface component 804 comprises graph 806, button 808, and component 810. User interface component 804, and/or any of the aforementioned items therein, are an exemplary representation of a result of comparing the user profile data for the user with a time-dependent goal (e.g., generated using logic 600 and/or graphical user interface generator 314). Advertisement 812 may be an advertisement for the website on which it is displayed (e.g. match.com) or maybe for a different website, a product, a service, or combination thereof.

Graph 806 is a semi-circular bar graph (e.g., titled "Match Success Meter") including four semi-circular bars each corresponding to a type of communication. In this example, the types of communications include winks (e.g., as indicated by a winking smiley face icon), favorites (e.g., as indicated by a star icon), likes (e.g., as indicated by a thumb-up icon), and emails (e.g., as indicated by an envelope icon). A length of each bar in the semi-circular bar graph, relative to its overall maximum length along the semi-circle, represents a fraction (or percentage) of a number of communications initiated over a predetermined period of time for a type of communication. In this example, the bars in the graph correspond to the user, Andy, having completed: 50% of a 7-day goal for sending winks to other users in the online dating community; 100% of a 7-day goal for sending favorites to other users in the online dating community; 50% of a 7-day goal for sending likes to other users in the online dating community; and 0% of a 7-day goal for sending emails to other users in the online dating community. The value of each percentage, and therefore the length of each bar in graph 806, may be determined by comparing Andy's user profile data with a target rate of initiating communications (e.g., initiating X number of communications within Y number of days, which is an exemplary time-dependent goal). The order of the icons at the lower boundary of the graph corresponds to the order of the bars in the graph. For example, the four icons, when read from left to right, correspond to the order of the four bars in the semi-circular bar graph, when read from the outside of the semi-circle toward the inside of the semi-circle.

Figure 9:
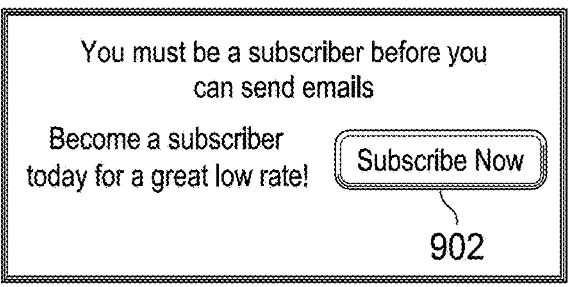
FIG. 9 illustrates an exemplary window for soliciting a user to subscribe to a website.

Button 808 comprises the text, "SEND MORE EMAILS". Upon receiving an input by button 808 (e.g., a user clicks button 808 to indicate that they want to send an email), an interface for sending an email may be generated, e.g., by a user interface system, for display to the user. In this example, because the user, Andy, is not a subscriber, instead of generating an interface for sending an email, an interface for subscribing to the website may be generated (e.g., as illustrated in FIG. 9 and/or as a prerequisite to allowing the user to send an email).

Component 810 comprises the text, "SEE ACTIVITY DETAILS>>". Upon receiving an input by component 810 (e.g., a user clicks component 810 to indicate that they want to see further details), further information regarding activity of the user may be generated, e.g., by a user interface system.

Figure 8B:
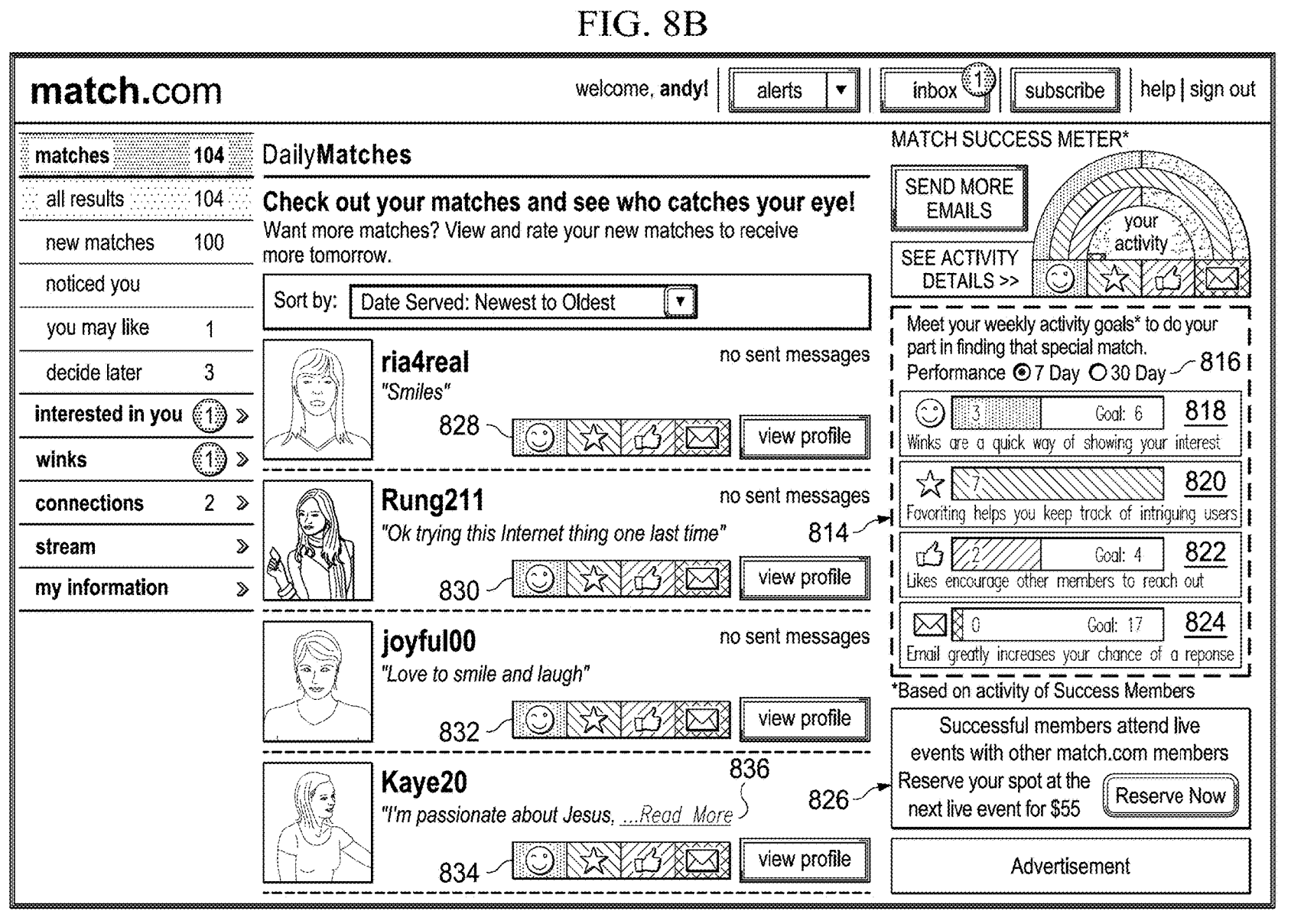

FIG. 8B illustrates an example screen shot of a website according to the present specification, which may result from receiving an input by component 810 in FIG. 8A. User interface component 814 comprises a toggle button 816, a graphical representation of wink data 818, a graphical representation of favorites data 820, a graphical representation of likes data 822, and a graphical representation of email data 824. User interface component 814, and/or any of the aforementioned items therein, are an exemplary representation of a result of comparing the user profile data for the user with a time-dependent goal (e.g., generated using logic 600 and/or graphical user interface generator 314). User interface component 814 is a detailed representation of result data represented by user interface component 804. In an implementation, component 814 may be a drop down menu that appears and/or disappears responsive to user inputs received by component 810. Toggle button 816 allows the user to choose a time window (time period) in which to compare their performance to a time-dependent goal. In this case, the user can choose between a seven-day time window and a 30-day time window. When the user selects either of the time windows, the user interface system may immediately provide a detailed representation (e.g., in user interface component 814) of data corresponding to the selected time window. Toggle button 816 is in a state where the seven-day time window is selected. This selection of the seven-day time window (or a different time window) may be a default setting provided as a starting point for the user. In another embodiment, the user may select a time window as a preferred time window in which to display data. The graphical representation of wink data 818 illustrates that the user has initiated three winks within the seven-day time window and that the target number for the user is to initiate six winks within the seven-day time window (a time-dependent goal). A bar within the representation 818 is shaded to level of 50% of a length of the bar to correspond to the user having completed 50% of the goal (i.e., (3 winks completed)/(6 winks goal)=50%). The graphical representation of favorites data 820 illustrates that the user has indicated seven users as favorites (i.e., initiated seven favorites) within the seven-day time window and that the target number for the user is to initiate seven favorites within the seven-day time window (a time-dependent goal). A bar within the representation 820 is shaded to level of 100% of a length of the bar to correspond to the user having completed 100% of the goal (i.e., (7 favorites completed)/(7 favorites goal)=100%). The graphical representation of likes data 822 illustrates that, within the seven-day time window, the user has indicated that he likes two user (i.e., initiated two like indications, or likes) and that the target number (goal) for the user is to initiate four likes (a time-dependent goal). A bar within the representation 822 is shaded to level of 50% of a length of the bar to correspond to the user having completed 50% of the goal (i.e., (2 likes completed)/(4 likes goal)=50%). The graphical representation of email data 824 illustrates that, within the seven-day time window, the user has initiated zero emails and that the target number (goal) for the user is to initiate 17 emails. Although, the user has completed 0% of the goal (i.e., (0 emails completed)/(17 emails goal)=0%), a bar within the representation 824 is shaded to level of approximately 0.5% of a length of the bar, e.g., to provide a visual indication of the goal to the user. In other embodiments, a bar corresponding to 0% may not be shaded at all or may be shaded a different length of the bar.

Advantageously, after receiving an indication that the user is interested in a result of the comparison (e.g., a user selection of component 810), an option for interacting with other users may be provided, e.g., by a user interface system. For example, upon receiving a user selection of component 810, advertisement 826 is generated to provide the user with an option to reserve a spot at a live event by selecting the button labeled "Reserve Now".

Upon receiving user input from a user indicating a request for further information regarding the user's communication activity (e.g., a user selection of component 810), a mechanism for the user to initiate communications may be output (e.g., generated on the user's display device). In the embodiment illustrated in FIG. 8B, user interface components 828, 830, 832, and 834 are exemplary mechanisms for the user to initiate communications (i.e., winks, favorites, likes, and emails). Each of user interface components 828, 830, 832, and 834 include a wink button, a favorite button, a like button, and an email button. User interface components 828, 830, 832, and 834 correspond to communications that the user, Andy, may send to users ria4real, Rung211, joyful00, and Kaye20, respectively. When selected, the buttons (i.e., any of the buttons in user interface components 828, 830, 832, and 834) may cause at least one processor to immediately perform a corresponding action (e.g., wink, favorite, like, or email) or may take the user's device to an interface for performing the corresponding action. In some cases, the user may not be granted access to the interface to perform the corresponding action (e.g., because they are not a paying subscriber). If the user does not have access, then selecting any of the buttons may cause at least one processor to retrieve an interface for soliciting the user to sign up for the online dating subscription, e.g., as illustrated in FIG. 9 and/or as a prerequisite to allowing the user to send an email.

Advantageously, an existing user interface component may be modified (e.g., by graphical user interface generator 314) to facilitate the user initiating communication with another user in the network. For example, because descriptive text provided for the user "Kaye20" is of a certain length (see, e.g., FIGS. 8A and 8B), the descriptive text has been modified by truncating a portion of the descriptive text, replacing the truncated portion by hyperlink 836 which reads " . . . . Read More", and user interface component 834 has been added, thereby allowing the user (Andy) to initiate communication with "Kaye20".

In an embodiment, a representation of a result for prompting a user to initiate a communication (e.g., user interface component 804 and/or user interface component 814) may comprise at least one of a message, a graphic, a button, text output, a remaining percentage, a completed percentage, an audio signal, etc. For example, a message may include "Send more likes", "Send more winks", "Send more emails", "Favorite more users", "Add more favorites", "Go on more dates", or "Call more users". A graphic may be an icon, a graphical progress bar, a bar graph, a pie graph, a histogram, a metered graphical representation, a virtual "meter" indicating an amount of progress toward a goal, a graphical representation that is visually similar to a gas meter ranging from zero to one or from Empty ("E") to Full ("F"), etc. A button, for example, may include a button that when clicked initiates a new communication, an "email" button, a "like" button, etc. Textual output may include, e.g., "7 emails sent", "2 calls placed", etc. A remaining percentage may include, e.g., "10% remaining before you reach your short-term goal for initiating emails", "85% remaining before you reach your long-term goal for initiating phone calls", "you must initiate 25% more likes to reach your 28-day goal", etc. A completed percentage may include, e.g., "you have completed 27% of your 7-day goal for initiating winks", "you have completed 27% of your 30-day goal for initiating phone calls", etc. An audio signal may include, e.g., a sound that increases or decreases in pitch as the user increases progress toward a goal, a voice speaking a message, a sound indicating that the user has or has not completed a goal, etc.

Figure 8C:
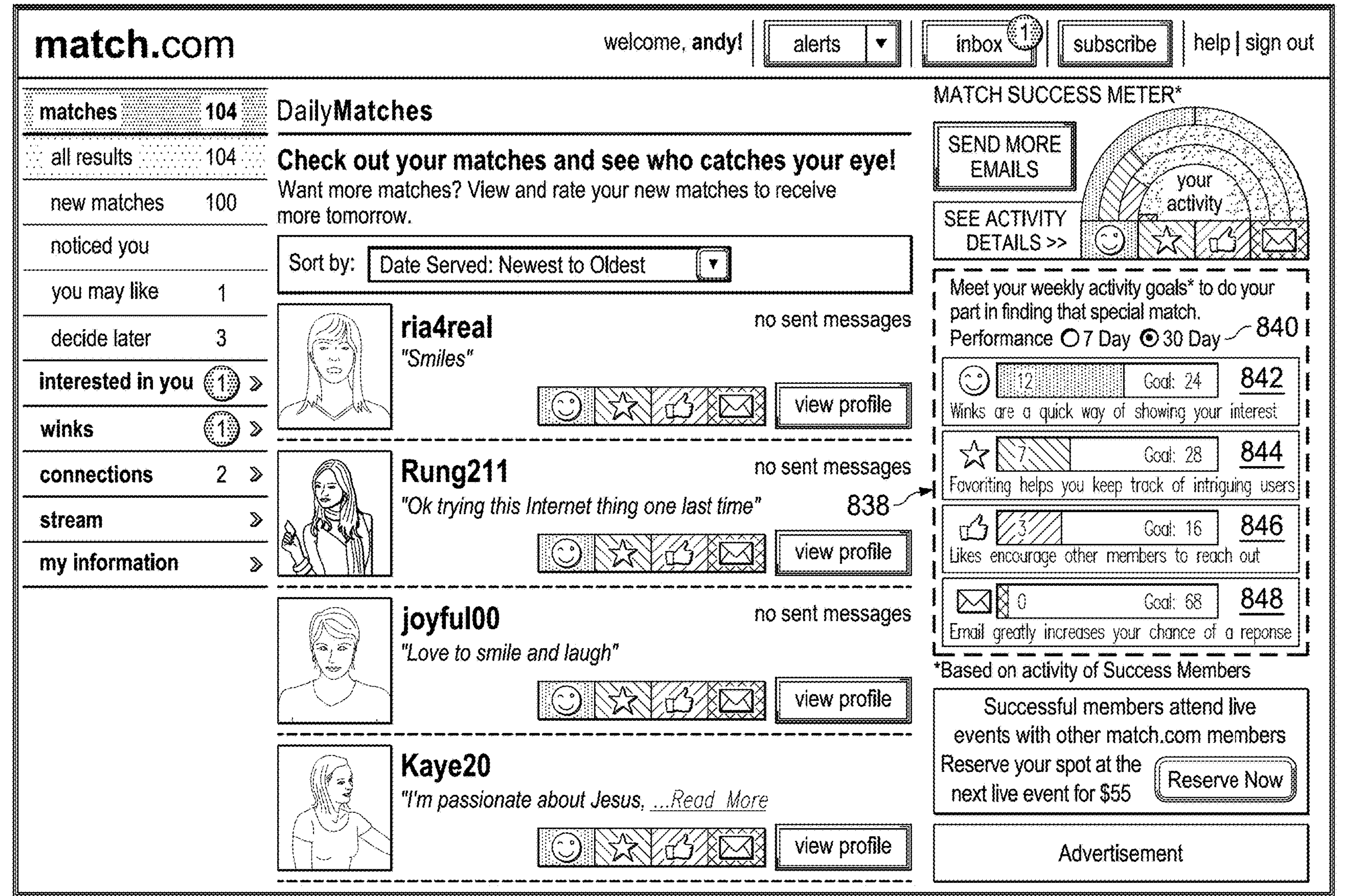

FIG. 8C illustrates an example screen shot of a website according to the present specification, which results from the user selecting a 30-day option from the toggle button 816 in FIG. 8B. In contrast to FIG. 8B, in which user toggle button 816 is set to a seven-day time window, FIG. 8C illustrates user interface component 838 in which user toggle button 840 is set to a 30-day time window. In this embodiment, the 30 day time window in FIG. 8C is a superset of the 7-day time window in FIG. 8B. User interface component 838 comprises components similar to those in user interface component 814. The graphical representation of wink data 842 illustrates that the user has initiated 12 winks within the 30-day time window and that the target number for the user is to initiate 24 winks within the 30-day time window (a time-dependent goal). A bar within the representation 842 is shaded to level of 50% of a length of the bar to correspond to the user having completed 50% of the goal (i.e., (12 winks completed)/(24 winks goal)=50%). The graphical representation of favorites data 844 illustrates that, within the 30-day time window, the user has indicated seven users as favorites (i.e., initiated seven favorites) and that the target number (goal) for the user is to initiate 28 favorites (a time-dependent goal). A bar within the representation 844 is shaded to level of 25% of a length of the bar to correspond to the user having completed 25% of the goal (i.e., (7 favorites completed)/(28 favorites goal)=25%). The graphical representation of likes data 846 illustrates that, within the 30-day time window, the user has indicated that he likes three users (i.e., initiated two like indications, or likes) and that the target number (goal) for the user is to initiate 16 likes. A bar within the representation 822 is shaded to level of approximately 19% of a length of the bar to correspond to the user having completed approximately 19% of the goal (i.e., (3 likes completed)/(16 likes goal)=18.75%≈19%). The graphical representation of email data 848 illustrates that, within the seven-day time window, the user has initiated zero emails and that the target number (goal) for the user is to initiate 68 emails within the seven-day time window (a time-dependent goal). Although, the user has completed 0% of the goal (i.e., (0 emails completed)/(68 emails goal)=0%), a bar within the representation 824 is shaded to level of approximately 0.5% of a length of the bar. The user may advantageously choose a time window from a set of time windows in which to view their performance. The data analyzed within the time window may be updated in real time to provide the user with current performance data.

Figure 8D:
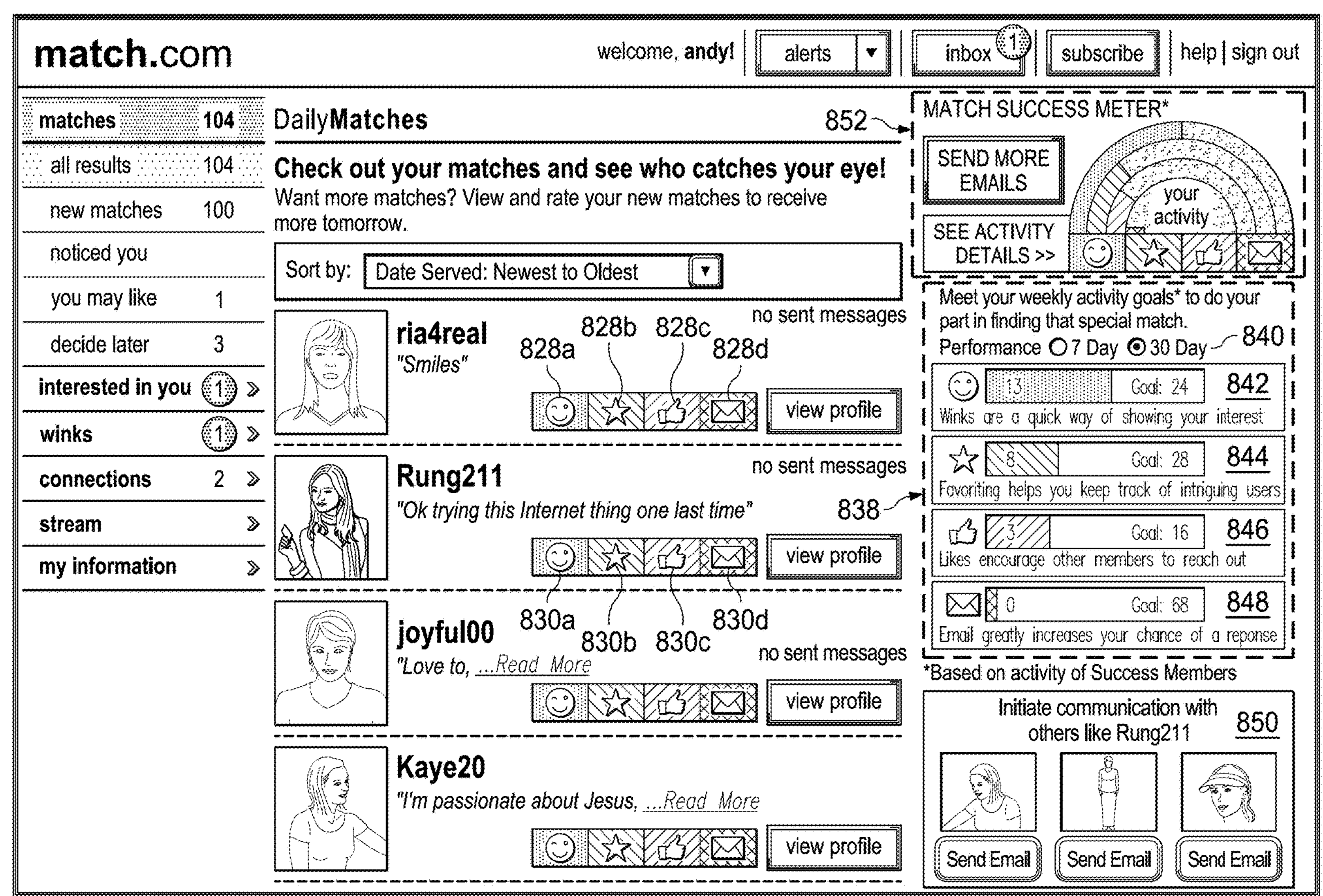

FIG. 8D illustrates a user interface according to the present disclosure, in which the user provided user input to initiate communications. First, the user selected button 828*a* to initiate a wink to user ria4real. Next, the user selected button 830*b* to add the user Rung211 as a favorite. User interface components 852 and 838 have been updated with shading (e.g., by graphical user interface generator 314) in response to the user input by buttons 828*a* and 830*b*. In response to the user's last selection (i.e., the selection of button 830*b* to favorite Rung211), the user is provided with component 850, which identifies other users that are similar to Rung211 and provides options for the user to communicate, by email, with each of those other users. The type(s) of communication available in component 850 may be determined based on the user's performance within a time window. In this example, it was determined (e.g., by an analysis system and/or user interface system) that component 850 would include an option for sending e-mails based on the user having the lowest percent complete toward the goal for sending emails. Such a determination may help the user to make progress on the goal with the lowest percent complete.

As previously stated, although the user Andy is a member of the website he is not a subscriber of the website. In response to a user input from Andy (or any other non-subscriber) for sending an email (e.g., a selection of email buttons in component 850, button 828*d*, button 830*d*, etc.), at least one processor may generate a window as shown in FIG. 9. FIG. 9 is an exemplary window for soliciting a user to subscribe to a website as a prerequisite to allowing the user to send an email. The window in FIG. 9 comprises button 902 and text indicating the subscription status of the user. Button 902 includes the text "Subscribe Now" and is an option soliciting the user to subscribe to the website.

Figure 10:
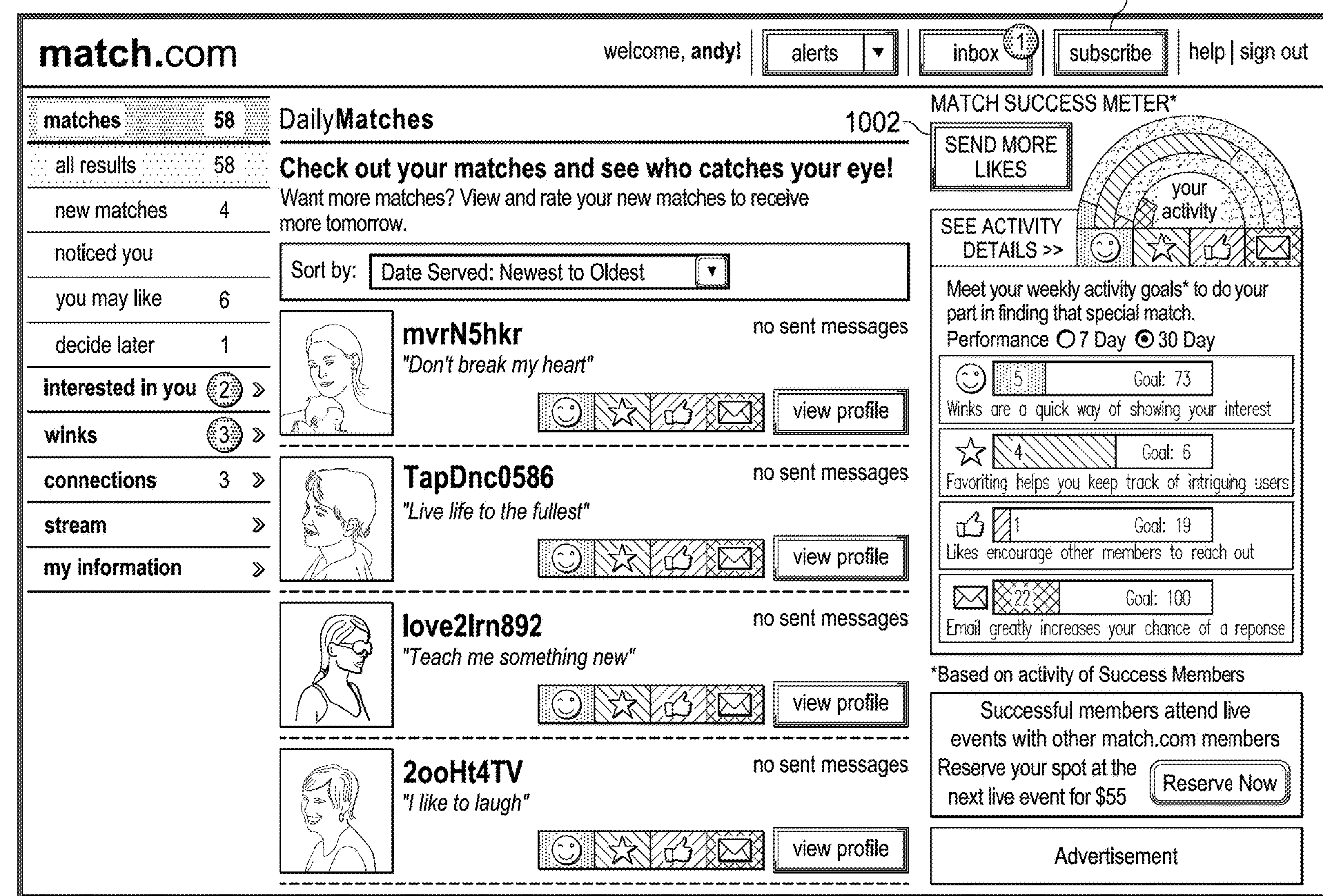
FIG. 10 illustrates an example screen shots that may be provided in an online dating process to facilitate presentation of information to and receiving input from users to facilitate communication on a website.

The message that reads "SEND MORE EMAILS", in buttons in FIGS. 8A-8D, corresponds to the goal for which the user has completed the least percentage when compared to each of the percentages for the other of the user's goals. In FIGS. 8A-8D, the user completed 0% of their e-mail goal and completed more than 0% of each of the wink goal, the favorite goal, and the like goal. Thus, the message displayed within e.g., button 808 (i.e., the message including the text "SEND MORE EMAILS") corresponds to the e-mail goal. FIG. 10 shows a user interface for a different user, Fred. In this example, the user, Fred, completed the least percentage of a goal for sending like. Thus, the message in button 1002 corresponded to Fred's goals for sending likes. Also, because Fred is a subscriber, selecting button 1004 does not take him to an interface for soliciting him to subscribe to the website (as was the case in FIGS. 8A-8B) and, instead, may take him to an interface for reserving a spot at a live event.

A message (e.g., the message shown in buttons 808 and/or 1002) may change dependent on the time-window in which the analysis is performed. For example, when analyzed within a 30-day window, the user may have completed the least percentage toward their goal for initiating likes, thus the message may recite "SEND MORE LIKES" (e.g., as shown in FIG. 10). However, the message may change when the user selects the 7-day time windows because, when analyzed within a 7-day window, the user may have completed the least percentage toward their goal for initiating emails. Thus, in this example, the message may change from "SEND MORE LIKES" to "SEND MORE EMAILS" when the user modifies an option to change the time window (e.g., selecting an option in a toggle button) in which the analysis is performed from the 30-day window to the 7-day window.

Figures 11A, 11B, 11C:
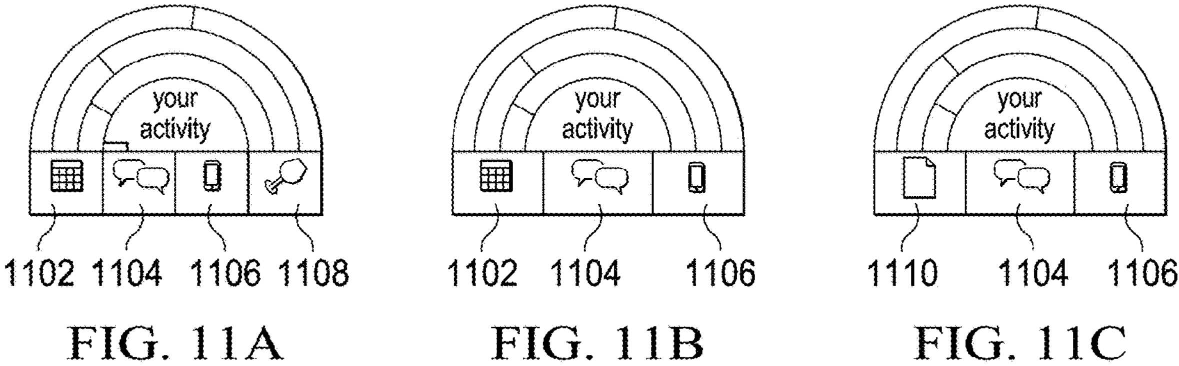
FIGS. 11A-11E illustrate exemplary graphs of a result of comparing user profile data to a goal.

FIGS. 11A-11E illustrate exemplary graphs of a result of comparing user profile data to a goal. Each of the graphs is an exemplary graphical output, e.g., generated using logic 600. In addition, each of the graphs is an exemplary representation of a result of comparing user profile data to a goal (e.g., representation 316 as generated by graphical user interface generator 314). As an alternative to, or in addition to, the data shown in the graphs in FIGS. 8A-8D and 10 (i.e., data for winks, favorites, likes, and emails), graphs may be generated based on other data. FIG. 11A illustrates an exemplary graph generated based on data for each of live events (e.g., as indicated by calendar icon 1102), instant messages (e.g., as indicated by message icon 1104), telephone calls (e.g., as indicated by telephone icon 1106), and invitations to meet for a drink (e.g., as indicated by wine glass icon 1108). Live events may comprise social events where two or more user's meet in person with the assistance of systems 10 and/or system 300 (e.g., the off-line component as discussed in reference to FIG. 1 and/or sponsored by match.com).

In addition, a graph according to the present disclosure may contain any number of items (e.g., number of types of communication). For example, the graph in FIG. 11A shows four types of user interactions (e.g., live events, instant messages, telephone calls, and invitations to meet for a drink) while the graph in FIG. 11B shows three types of communications (e.g., live events, instant messages, and telephone calls).

The data provided in a graph (or other graphical output or representation) according to the present disclosure may be dynamically updated based on new information. For example, a goal can be removed from, or replaced within, a graph based on a user completing the goal the system. In transition from FIG. 11A to FIG. 11B, a user interface system (e.g., graphical user interface generator 314) removed from the graph the goal corresponding to invitations to meet for a drink in response to the user having completed the number of invitations to achieve the goal. Thus, the icon corresponding to invitations to meet for a drink (i.e., icon 1108) is not present in FIG. 11B. In addition, the innermost semicircular bar in FIG. 11A has been removed and therefore is not present in FIG. 11B. In transition from FIG. 11B to FIG. 11C, a user interface system (e.g., graphical user interface generator 314) replaced a complete goal (e.g., a number of live events corresponding to icon 1102) with a new goal (e.g., a number of hand-written letters corresponding to icon 1110).

Figure 11D:
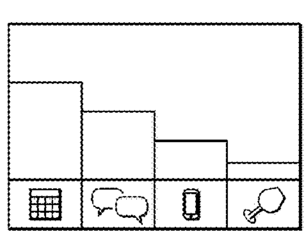
Figure 11E:
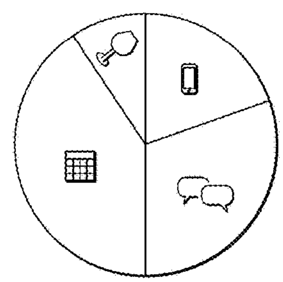

In FIGS. 11A-11C a result of comparing user profile data to a goal is represented using a semicircular bar graph. Other representations may be utilized. For example, FIG. 11D shows a vertical bar graph corresponding to the data shown in the graph of FIG. 11A. FIG. 11E is a pie graph corresponding to the data shown in the graph of FIG. 11A. In an embodiment, the representation comprises at least one of a metered representation, a virtual "meter" indicating an amount of progress toward a goal, a graphical representation that is visually similar to a gas meter ranging from zero to one or from Empty ("E") to Full ("F"), etc. Still other representations may be used, e.g., including but not limited to the representations as described for representation 316 (in FIG. 3).

A system for user communication in an online community according to the present disclosure may be implemented in any device. For example, FIGS. 8A-8D and 10 illustrate implementations on a website. However the system may be provisioned on a server, a computing device, a mobile device, etc. For example, FIGS. 12A-12C, 13 and 14 illustrate example screen shots that may be provided in an online dating process to facilitate presentation of information to and receiving input from users to facilitate communication using a mobile device. FIGS. 12A-12C, 13 and 14 also illustrate exemplary user activity of a user on the mobile device.

Figure 12B:
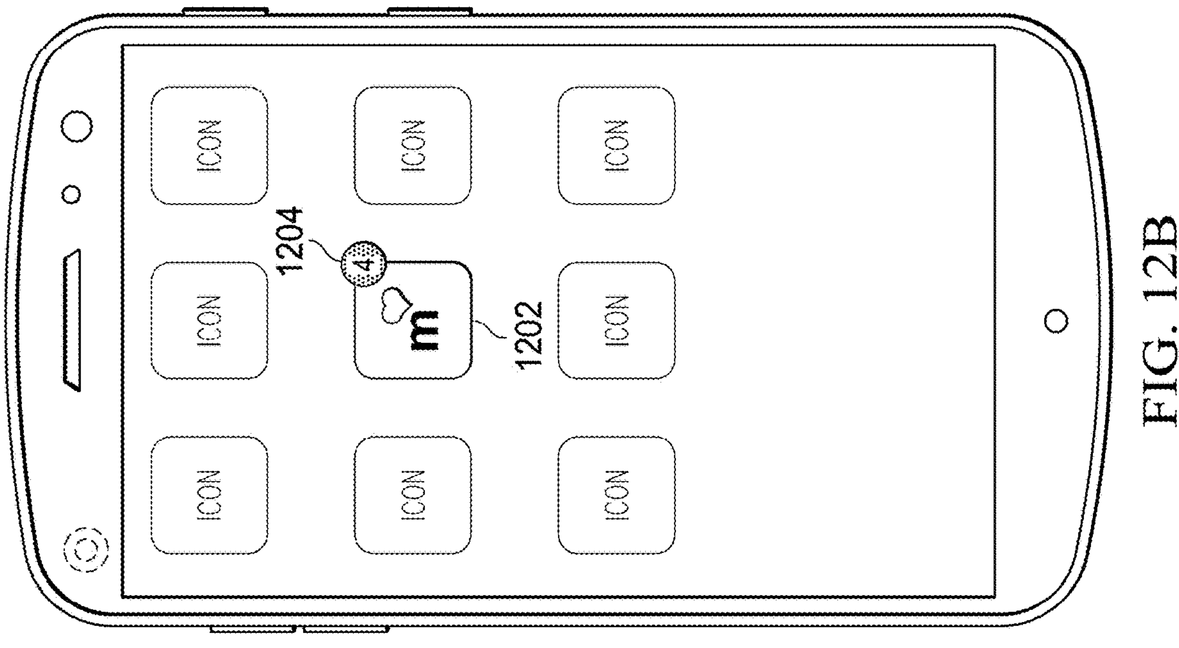
FIGS. 12A-12C, 13 and 14 illustrate example screen shots that may be provided in an online dating process to facilitate presentation of information to and receiving input from users to facilitate communication using a mobile device.
Figure 12A:
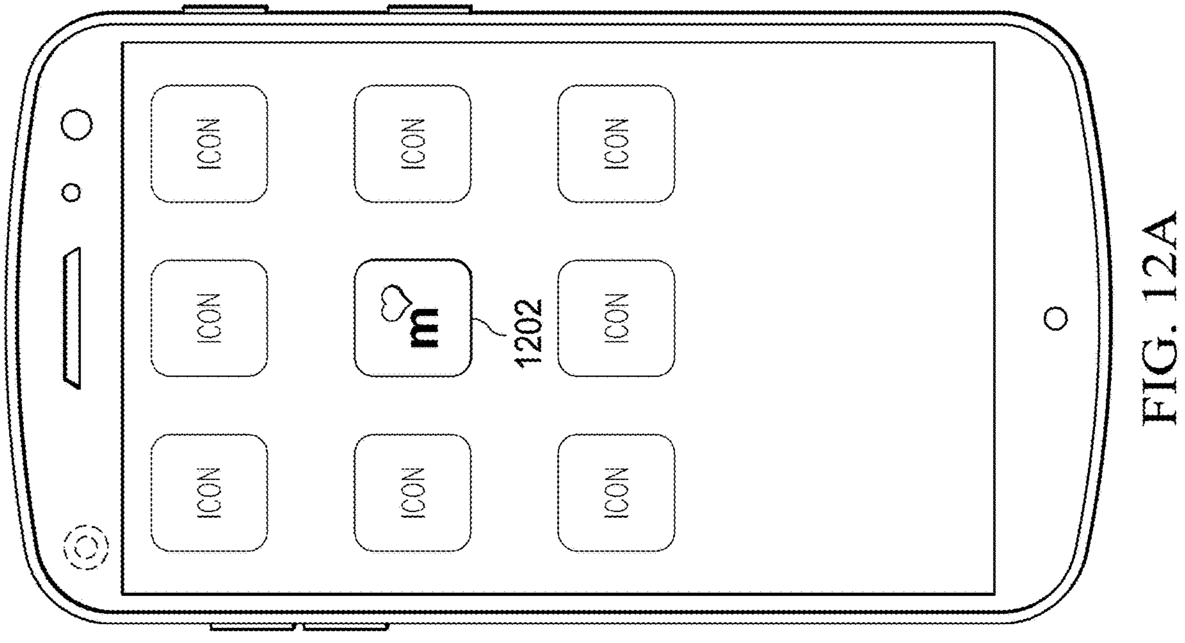

In FIG. 12A, a user interface, on a mobile device, comprises an array of icons, where each icon corresponds to an application implemented on the mobile device. Icon 1202 is an icon for match.com and corresponds to a match.com application, implemented according to the present disclosure. FIG. 12B shows the user interface of FIG. 12A where icon 1202 has been overlaid with graphic 1204. Graphic 1204 include a circle containing the number 4, which corresponds to a number of winks that the user must to complete (i.e., a deficit) to reach a goal for initiating winks to other users. In this example the text (i.e., the number "4" in graphic 1204) represents a number of communications yet to be completed to achieve a goal. The number in graphic 1204 may be determined by comparing data from a user profile data with a goal (e.g., with a time-dependent goal) and outputting the result (e.g., the amount of deficit) between the user profile data and the goal. In an implementation, the number may be determined for the goal with the highest percent complete, which is also the goal where the least number of communications are needed to complete the goal. In another implementation, the number may be determined for the goal with the lowest percent complete, which is also the goal where the most number of communications are needed to complete the goal. In other implementations, the number in graphic 1204 may indicate a number of communications that the user has already completed.

Figure 12C:
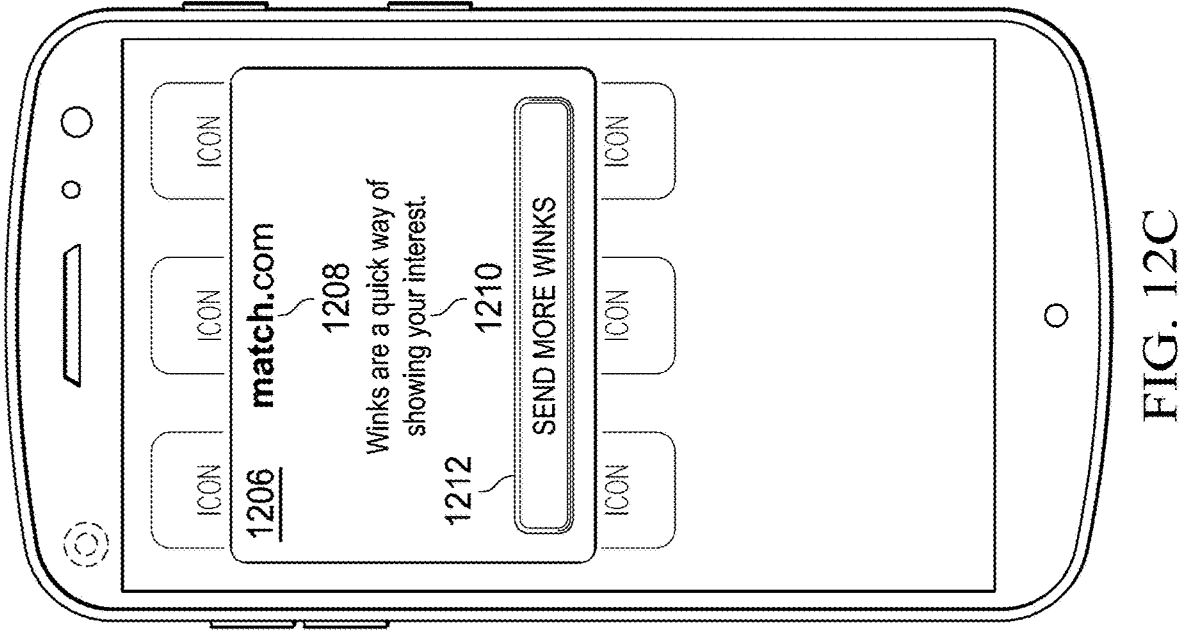

FIG. 12C shows the user interface of FIG. 12A or 12B where the array of icons has been overlaid with pop-up window 1206. Pop-up window 1206 comprises title 1208 (i.e., match.com), message 1210 (i.e., "Winks are a quick way of showing your interest."), and button 1212 (i.e., button labeled "SEND MORE WINKS"). Title 1208 identifies a source of the menu as match.com. Message 1210 provides a description of a type of communication to which the message pertains. In this example, the message describes winks. In other implementations, the message may describe a different type of communication, a plurality of types of communications, and/or other dating information. Button 1212 allows the user to provide user input in response to the message. For example, the user may select button 1212 (e.g., by touching the screen in a corresponding area) to indicate a desire to send more communications, which, in this example, comprises sending winks through a match.com application. The user may select an area of the screen outside of window 1206 to indicate a desire not to send more communications.

Figure 13:
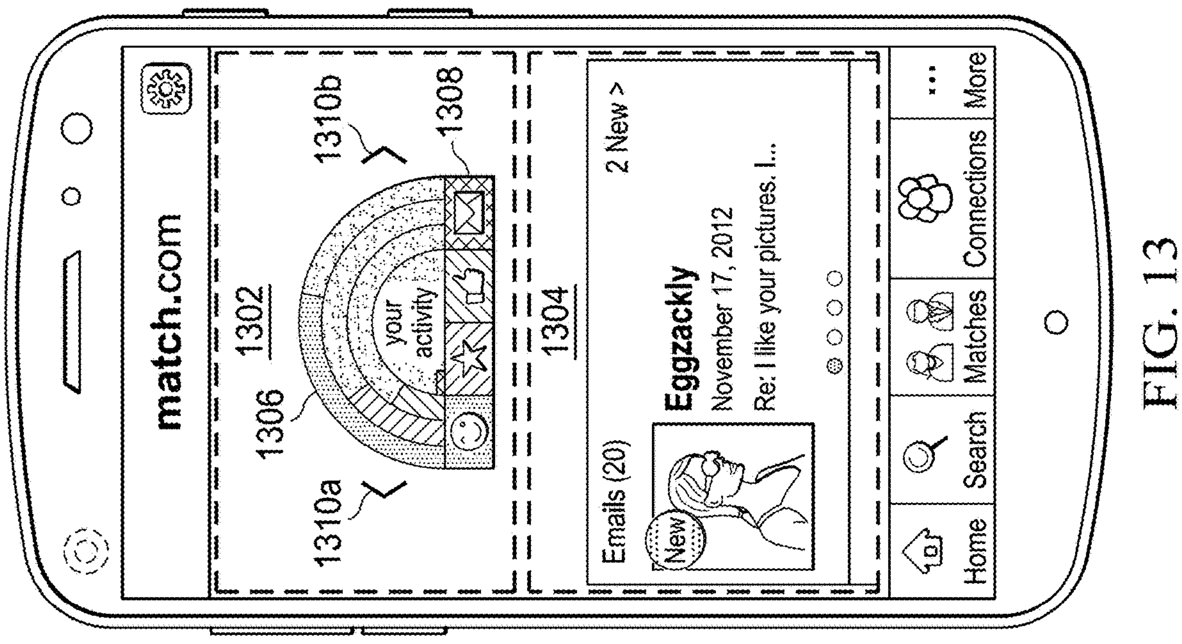
Figure 14:

Upon receiving a user input indicating a desire to send more communications, a system for user communication (e.g., system 300) may generate a representation of the data. For example, upon receiving a user selection of icon 1202 or of button 1212, the system may generate a representation as shown in either of FIGS. 13 and 14. FIGS. 13 and 14 illustrate a representation of a result of comparing user profile data to a goal in a dating network in an exemplary user interface on a mobile phone. In one embodiment, upon receiving a user selection of a user interface component in FIG. 13, the system may take the user to the user interface illustrated in FIG. 14.

FIG. 13 illustrates a user interface comprising component 1302 and communication interface 1304. Component 1302 comprises graph 1306, icons 1308, and swipe arrows 1310. Component 1302 and/or any of the aforementioned items therein, are an exemplary representation of a result of comparing the user profile data for the user with a time-dependent goal (e.g., generated using logic 600 and/or graphical user interface generator 314). Component 1302 may behave in a manner similar to representation 804 (as illustrated in FIG. 8A). Upon receiving a user selection of graph 1306 the system may provide further details (similar to component 814 in FIG. 8B) on the result of the comparison. Graph 1306 and/or icons 1308 may be implemented as described with respect to any of FIG. 8A-8D or 11A-11E. Graph 1306 and icons 1308 correspond to winks, favorites, telephone calls, and emails. Swipe arrows 1310 may allow the user to navigate between different time windows. For example, FIG. 13 illustrates data for a 7-day time window. Selecting swipe arrow 1310*a* may cause the system update the displaying a graph of data for a 7-day time window to generate a graph of data for a 30-day time window (similar to the behavior of toggle buttons 816 and 840 as illustrated in FIGS. 8B-8D). Communication interface 1304 provides indicators for each type of communication represented in interface 1302 including emails, winks, favorites, and phone calls.

User profile data made advantageously comprise data retrieved from a user's device (e.g., a smart phone or other mobile device) on which the interface is implemented. For example, the user profile data may include user's call data (e.g., call log) retrieved from a mobile phone. The call data may be compared to a time-dependent goal of completing a number of phone calls. In an implementation, an interface on the mobile device may solicit the user to allow the interface (or application) to access mobile phone data including call data, location data, calendar information, etc. for inclusion in the user profile data and/or for processing in an analysis. In one example, phone numbers in a user's call log can be compared to phone numbers stored in other users' dating profile data to determine the number of calls that the user initiated to other users in a dating website.

In one implementation, upon receiving a user selection of at least a portion of component 1302 (e.g., buttons 1308 or graph 1306), the system may provide a list of users that are potential matches with the user and an option for the user to initiate communication with those users. For example, FIG. 14 shows an exemplary implementation of such an interface, which maybe generated in response receiving a user selection of component 1302. The user interface in FIG. 14 comprises user profile 1402, buttons 1404, and button 1406. User profile 1402 is for a user ("crazyfresh67") who is a potential match for a user currently logged into the mobile phone application. Buttons 1404 (i.e., buttons labeled "Wink at Her", "Email Her", "Add to Favorites", "Call Her") to allow the user to initiate communication with the potential match, crazyfresh67. Upon selecting any of buttons 1404 a system for user communication (e.g., system 300) may immediately generate an interface allowing the user to compose the communication (e.g., composing an e-mail), or may generate and send the communication immediately upon user selecting button, and without any further user input (e.g., immediately send a wink, immediately add her as a favorite, or immediately call her). The user crazyfresh67 is one potential match on the list of users that are potential matches. The user may select the next button 1406 to navigate to other users on the list of users that are potential matches.

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

Although the present disclosure discusses an end user being prompted (e.g., using graphical output and/or messages) to initiate communication with other users based on comparing the user's profile data to a time-dependent goal, it is also envisioned that a customer care agent, an end user of the system, may be receive a prompted to initiate communication with other users based on another end user's profile data. The graphical output and/or messages may be presented to the customer care agent. Subsequently, the graphical output and/or messages may be forwarded/provided to the end user (e.g., via an online chat widget, over the phone, in an email, or any suitable communication means). The end user may then act in response to the graphical output and/or messages. A customer care agent facilitates such a communication mechanism.

It should also be noted that any of the user profile portions of the platform can leverage any type of format. Thus, in any aspect of the online dating process described herein, such as establishing a personality or user profile, for example, any suitable question format (and thus values for various fields as well) can be employed. Example formats include a Yes/No format, a multiple choice question format, a short answer format, a true/false format, etc. Other formats can readily be used in order to achieve the desired responses and solicit the necessary data. Information related to the user profile in these formats are usable in measuring the end user against a goal.

Note that in certain example implementations, the matching functions outlined herein, such as those carried out by web server 16 and/or provided as an application for an endpoint being operated by an end user (e.g., a mobile application for an iPhone™), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that systems 10 and 300 (and their teachings) are readily scalable and can accommodate a large number of components, as well as more complicated/sophisticated arrangements and configurations. Accordingly, the examples provided should not limit the scope or inhibit the broad teachings of systems 10 and 300 as potentially applied to a myriad of other architectures.

It is also important to note that the steps (or procedures) in the preceding flow diagrams illustrate only some of the possible signaling scenarios and patterns that may be executed by, or within, systems 10 and/or 300. Some of these steps (or procedures) may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by systems 10 and 300 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method implemented by an online dating service, the method comprising:

providing a plurality of time-dependent goals for a first user of the online dating service for a plurality of actions in a plurality of time windows;

determining a goal for the first user of the online dating service, the goal being one of the plurality of time-dependent goals and being a benchmark for initiating communications with other users on the online dating service;

accessing user profile data of the first user; and comparing the user profile data of the first user with the goal to generate a prompt for the first user to perform at least one action associated with the goal, wherein the at least one action is one of the plurality of actions and is to initiate at least one communication indicative of a dating interest of the first user in a second user of the online dating service, the at least one action defined by a number of communications to be performed to other users on the online dating service within a predetermined number of days, and the predetermined number of days is one of the plurality of time windows, the prompt including at least one of a message or text output.

2. The method of claim 1, wherein the at least one communication is a like.

3. The method of claim 1, further comprising:

determining the goal, at least in part based on an analysis of at least one user having a predefined level of success in the online dating service.

4. The method of claim 1, wherein the predetermined number of days is a multiple of seven days.

5. The method of claim 1, wherein the second user is a user of the online dating service with whom the first user has not previously communicated.

6. An apparatus for an online dating service, the apparatus comprising:

a memory including logic; and a processor that executes the logic to provide a plurality of time-dependent goals for a first user of the online dating service for a plurality of actions in a plurality of time windows, determine a goal for the first user of the online dating service, the goal being one of the plurality of time-dependent goals and being a benchmark for initiating communications with other users on the online dating service, access user profile data of the first user, and compare the user profile data of the first user with the goal to generate a prompt for the first user to perform at least one action associated with the goal, wherein the at least one action is one of the plurality of actions and is to initiate at least one communication indicative of a dating interest of the first user in a second user of the online dating service, the at least one action defined by a number of communications to be performed to other users on the online dating service within a predetermined number of days, and the predetermined number of days is one of the plurality of time windows, the prompt including at least one of a message or text output.

7. The apparatus of claim 6, wherein the at least one communication is a like.

8. The apparatus of claim 6, wherein the processor further executes the logic to determine the goal, at least in part based on an analysis of at least one user having a predefined level of success in the online dating service.

9. The apparatus of claim 6, wherein the predetermined number of days is a multiple of seven days.

10. The apparatus of claim 6, wherein the second user is a user of the online dating service with whom the first user has not previously communicated.

11. A non-transitory, computer-readable medium encoded with logic that, when executed by a processor, performs operations implemented by an online dating service, the operations comprising:

providing a plurality of time-dependent goals for a first user of the online dating service for a plurality of actions in a plurality of time windows;

determining a goal for the first user of the online dating service, the goal being one of the plurality of time-dependent goals and being a benchmark for initiating communications with other users on the online dating service;

accessing user profile data of the first user; and comparing the user profile data of the first user with the goal to generate a prompt for the first user to perform at least one action associated with the goal, wherein the at least one action is one of the plurality of actions and is to initiate at least one communication indicative of a dating interest of the first user in a second user of the online dating service, the at least one action defined by a number of communications to be performed to other users on the online dating service within a predetermined number of days, and the predetermined number of days is one of the plurality of time windows, the prompt including at least one of a message or text output.

12. The medium of claim 11, wherein the at least one communication is a like.

13. The medium of claim 11, the operations further comprising:

determining the goal, at least in part based on an analysis of at least one user having a predefined level of success in the online dating service.

14. The medium of claim 11, wherein the predetermined number of days is a multiple of seven days.

15. The medium of claim 11, wherein the second user is a user of the online dating service with whom the first user has not previously communicated.

* * * * *